(12) United States Patent
Ichihashi et al.

(10) Patent No.: US 10,957,029 B2
(45) Date of Patent: Mar. 23, 2021

(54) IMAGE PROCESSING DEVICE AND IMAGE PROCESSING METHOD

(71) Applicant: SONY CORPORATION, Tokyo (JP)

(72) Inventors: Hideyuki Ichihashi, Tokyo (JP); Masashi Uchida, Tokyo (JP)

(73) Assignee: SONY CORPORATION, Tokyo (JP)

( * ) Notice: Subject to any disclaimer, the term of this patent is extended or adjusted under 35 U.S.C. 154(b) by 98 days.

(21) Appl. No.: 16/333,825

(22) PCT Filed: Aug. 28, 2017

(86) PCT No.: PCT/JP2017/030720
§ 371 (c)(1),
(2) Date: Mar. 15, 2019

(87) PCT Pub. No.: WO2018/092379
PCT Pub. Date: May 24, 2018

(65) Prior Publication Data
US 2019/0259139 A1    Aug. 22, 2019

(30) Foreign Application Priority Data

Nov. 17, 2016 (JP) .............................. JP2016-223973

(51) Int. Cl.
| | |
|---|---|
| *G06T 5/50* | (2006.01) |
| *G06T 3/00* | (2006.01) |
| *H04N 5/225* | (2006.01) |
| *H04N 5/232* | (2006.01) |
| *G06T 3/40* | (2006.01) |

(52) U.S. Cl.
CPC .............. *G06T 5/50* (2013.01); *G06T 3/0093* (2013.01); *G06T 3/4038* (2013.01); *H04N 5/225* (2013.01); *H04N 5/232* (2013.01); *G06T 2207/20221* (2013.01)

(58) Field of Classification Search
None
See application file for complete search history.

(56) References Cited

U.S. PATENT DOCUMENTS

| | | | | |
|---|---|---|---|---|
| 2007/0286476 A1* | 12/2007 | Kim | .................. | G06K 9/32 |
| | | | | 382/154 |
| 2016/0142627 A1* | 5/2016 | Chou | .................. | H04N 5/265 |
| | | | | 348/240.2 |

FOREIGN PATENT DOCUMENTS

JP        2013-219525 A    10/2013

* cited by examiner

*Primary Examiner* — David Perlman
(74) *Attorney, Agent, or Firm* — Paratus Law Group, PLLC

(57) ABSTRACT

A fusion processing unit performs warping with a high quality image as a reference by using a wide angle image that is generated by an imaging unit and has a wider angle of view than the high quality image generated by the imaging unit in a case where a predetermined condition is satisfied, and generates a fusion image by matching positions of image overlapping regions with each other of the high quality image having a higher image quality than the wide angle image and the wide angle image after the warping. A captured image can be generated having a wide angle of view and high image quality without degrading image quality using a plurality of captured images respectively having different angles of view and resolutions.

15 Claims, 20 Drawing Sheets

FIG. 1
(a) 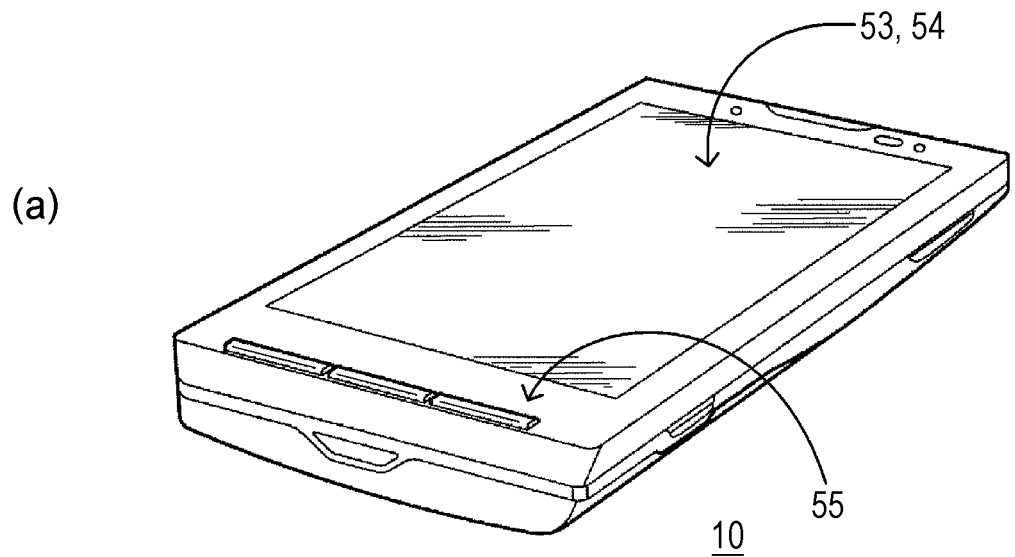
(b) 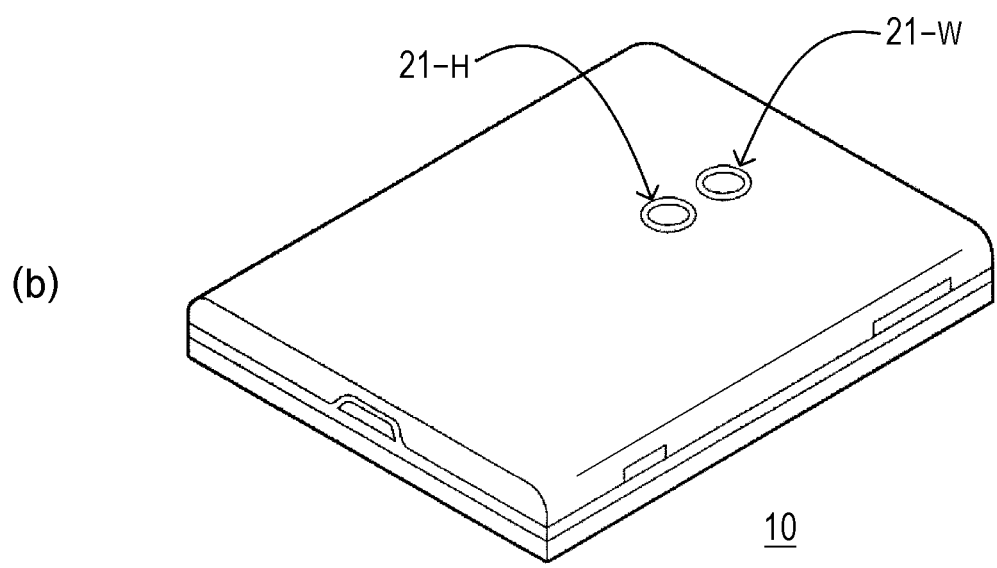

FIG. 16

(a) MOVING IMAGE

| | | DETERMINATION ELEMENT | | INTEGRATION DETERMINATION RESULT | |
|---|---|---|---|---|---|
| | | RESULT OF REFERENCE IMAGE DETERMINATION BASED ON DISTANCE | RESULT OF REFERENCE IMAGE DETERMINATION BASED ON LUMINANCE DIFFERENCE | | |
| WIDE ANGLE MODE | | MONOCHROME CAPTURED IMAGE | MONOCHROME CAPTURED IMAGE | HIGH QUALITY IMAGE REFERENCE FUSION PROCESSING | (REFERENCE IMAGE, ANGLE OF VIEW) |
| | | MONOCHROME CAPTURED IMAGE | COLOR CAPTURED IMAGE | HIGH QUALITY IMAGE REFERENCE FUSION PROCESSING | (MONOCHROME CAPTURED IMAGE, WIDE ANGLE OF VIEW) |
| | | COLOR CAPTURED IMAGE | MONOCHROME CAPTURED IMAGE | WIDE ANGLE IMAGE REFERENCE FUSION PROCESSING | (COLOR CAPTURED IMAGE, WIDE ANGLE OF VIEW) |
| | | COLOR CAPTURED IMAGE | COLOR CAPTURED IMAGE | WIDE ANGLE IMAGE REFERENCE FUSION PROCESSING | (COLOR CAPTURED IMAGE, WIDE ANGLE OF VIEW) |
| IMAGE QUALITY PRIORITY MODE | | — | — | WIDE ANGLE IMAGE REFERENCE FUSION PROCESSING | (COLOR CAPTURED IMAGE, WIDE ANGLE OF VIEW) |
| | | | | NARROW ANGLE FUSION PROCESSING | (MONOCHROME CAPTURED IMAGE, NORMAL ANGLE OF VIEW) |

(b) STILL IMAGE

| | | DETERMINATION ELEMENT | | INTEGRATION DETERMINATION RESULT | |
|---|---|---|---|---|---|
| | | RESULT OF REFERENCE IMAGE DETERMINATION BASED ON DISTANCE | RESULT OF REFERENCE IMAGE DETERMINATION BASED ON LUMINANCE DIFFERENCE | | |
| WIDE ANGLE MODE | | MONOCHROME CAPTURED IMAGE | MONOCHROME CAPTURED IMAGE | HIGH QUALITY IMAGE REFERENCE FUSION PROCESSING | (REFERENCE IMAGE, ANGLE OF VIEW) |
| | | MONOCHROME CAPTURED IMAGE | COLOR CAPTURED IMAGE | HIGH QUALITY IMAGE REFERENCE FUSION PROCESSING | (MONOCHROME CAPTURED IMAGE, WIDE ANGLE OF VIEW) |
| | | COLOR CAPTURED IMAGE | MONOCHROME CAPTURED IMAGE | WIDE ANGLE IMAGE REFERENCE FUSION PROCESSING | (COLOR CAPTURED IMAGE, WIDE ANGLE OF VIEW) |
| | | COLOR CAPTURED IMAGE | COLOR CAPTURED IMAGE | WIDE ANGLE IMAGE REFERENCE FUSION PROCESSING | (COLOR CAPTURED IMAGE, WIDE ANGLE OF VIEW) |
| NORMAL ANGLE MODE | | — | — | NARROW ANGLE FUSION PROCESSING | (MONOCHROME CAPTURED IMAGE, NORMAL ANGLE OF VIEW) |
| AUTO ANGLE MODE | | MONOCHROME CAPTURED IMAGE | MONOCHROME CAPTURED IMAGE | HIGH QUALITY IMAGE REFERENCE FUSION PROCESSING | (MONOCHROME CAPTURED IMAGE, WIDE ANGLE OF VIEW) |
| | | MONOCHROME CAPTURED IMAGE | COLOR CAPTURED IMAGE | NARROW ANGLE FUSION PROCESSING | (MONOCHROME CAPTURED IMAGE, NORMAL ANGLE OF VIEW) |
| | | COLOR CAPTURED IMAGE | MONOCHROME CAPTURED IMAGE | NARROW ANGLE FUSION PROCESSING | (MONOCHROME CAPTURED IMAGE, NORMAL ANGLE OF VIEW) |
| | | COLOR CAPTURED IMAGE | COLOR CAPTURED IMAGE | NARROW ANGLE FUSION PROCESSING | (MONOCHROME CAPTURED IMAGE, NORMAL ANGLE OF VIEW) |

FIG. 18
(a)
| FUSION DETERMINATION INFORMATION | PERFORMANCE | | |
|---|---|---|---|
| | IMAGE QUALITY | | ANGLE OF VIEW |
| | IMAGE OVERLAPPING REGION | FRAME REGION | |
| HIGH QUALITY IMAGE REFERENCE FUSION PROCESSING | ◎ | △ | WIDE |
| WIDE ANGLE IMAGE REFERENCE FUSION PROCESSING | ○ | △ | WIDE |
| NARROW ANGLE FUSION PROCESSING | ◎ | — | NORMAL |
(b) 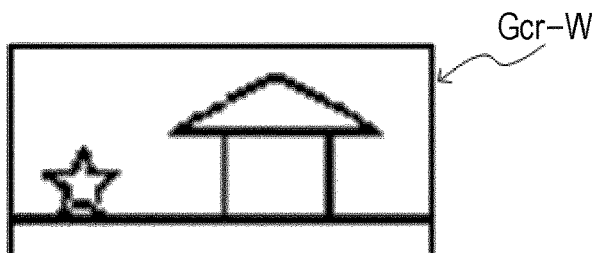
(c) 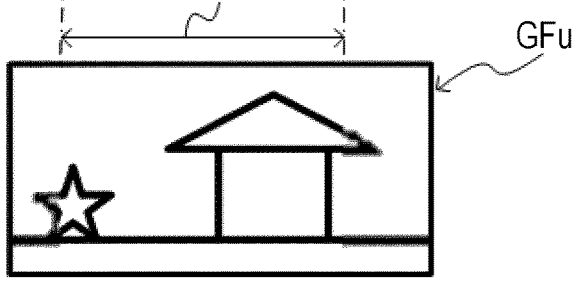
(d) 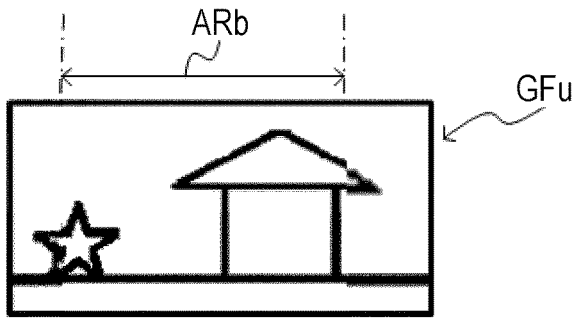
(e) 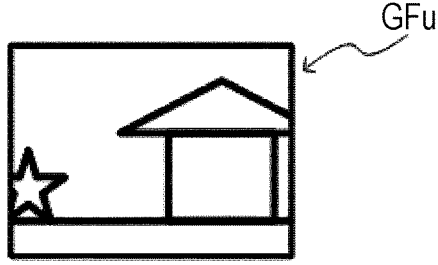

ns to Prior Application

This application is a National Stage Patent Application of PCT International Patent Application No. PCT/JP2017/030720 (filed on Aug. 28, 2017) under 35 U.S.C. § 371, which claims priority to Japanese Patent Application No. 2016-223973 (filed on Nov. 17, 2016), which are all hereby incorporated by reference in their entirety.

TECHNICAL FIELD

This technology relates to an image processing device and an image processing method, and enables generation of a captured image having a wide angle of view and a high resolution without degrading image quality using captured images respectively having different angles of view and resolutions.

BACKGROUND ART

In conventional portable electronic devices such as information processing terminals, for example, smartphones, image qualities of their imaging units are degraded as compared with single-lens reflex cameras and the like due to downsizing and thinning. For this reason, for example, Patent Document 1 discloses that a plurality of imaging units is provided and a plurality of images is simultaneously generated having different image qualities, for example, images having a first angle of view and a second angle of view narrower than the first angle of view.

CITATION LIST

Patent Document

Patent Document 1: Japanese Patent Application Laid-Open No. 2013-219525

SUMMARY OF THE INVENTION

Problems to be Solved by the Invention

Meanwhile, it is impossible to acquire a captured image exceeding performance of the imaging units only by providing the plurality of imaging units as in Patent Document 1.

This technology therefore aims to provide an image processing device and an image processing method capable of generating a captured image having a wide angle of view and high image quality without degrading the image quality using a plurality of captured images respectively having different angles of view and image qualities.

Solutions to Problems

A first aspect of this technology is in an image processing device including a fusion processing unit performing warping with a high quality image as a reference on a wide angle image having a lower image quality and a wider angle of view than the high quality image, the fusion processing unit performing high quality image reference fusion processing that generates a fusion image by matching positions of image overlapping regions with each other of the high quality image and the wide angle image after the warping.

In this technology, the fusion processing unit performs the high quality image reference fusion processing. The fusion processing unit performs the warping with the high quality image as the reference on the wide angle image having the lower image quality and the wider angle of view than the high quality image. The warping is performed on the basis of parallax information regarding the high quality image and the wide angle image, and parallax information on an image non-overlapping region not included in the high quality image in the wide angle image is interpolated by using parallax information on the image overlapping region. Furthermore, the fusion processing unit generates the fusion image by matching the positions of the image overlapping regions with each other of the high quality image having a higher image quality than the wide angle image and the wide angle image after the warping.

Furthermore, on the basis of a determination result of a determination unit, the fusion processing unit performs the high quality image reference fusion processing in a case where a predetermined condition is satisfied, and performs wide angle image reference fusion processing in a case where the predetermined condition is not satisfied. In the wide angle image reference fusion processing, warping with the wide angle image as a reference is performed by using the high quality image, and a fusion image is generated by matching positions of image overlapping regions with each other of the high quality image after the warping and the wide angle image on which the warping is not performed.

For example, the determination unit sets as the predetermined condition that a subject distance is longer than a determination threshold value, the subject distance being determined on the basis of the parallax information for a subject positioned in the image non-overlapping region not included in the high quality image in the wide angle image. Furthermore, the determination unit sets as the predetermined condition that a luminance difference between average luminances of an image region within a predetermined range from a boundary with the image non-overlapping region in the image overlapping region is equal to or less than a determination threshold value, for example.

Furthermore, the fusion processing unit performs narrow angle fusion processing. The fusion processing unit performs warping with the high quality image as the reference by using the wide angle image, and generates the fusion image having an angle of view of the high quality image by matching the positions of the image overlapping regions with each other of the high quality image and the wide angle image after the warping.

The fusion processing unit performs the high quality image reference fusion processing or the wide angle image reference fusion processing on the basis of the determination result of the determination unit in a case where the high quality image and the wide angle image are moving images and a fusion image is generated having an angle of view of the wide angle image. The fusion processing unit performs the high quality image reference fusion processing, the wide angle image reference fusion processing, or the narrow angle fusion processing in a case where the high quality image and the wide angle image are still images. The fusion processing unit performs the wide angle image reference fusion processing or the narrow angle fusion processing in a case where the predetermined condition is not satisfied, on the basis of the determination result of the determination unit. Moreover, the fusion processing unit performs the narrow angle fusion processing in a case where it is determined by the determination unit that mode selection for automatically setting an angle of view of the fusion image is performed in a case where the predetermined condition is not satisfied. Furthermore, the determination unit determines user selection operation of fusion processing, and the fusion processing unit performs the narrow angle fusion processing regardless of whether or not the predetermined condition is satisfied in a case where it is determined by the determination unit that the narrow angle fusion processing is selected.

A second aspect of this technology is in an image processing method including performing warping with a high quality image as a reference on a wide angle image having a lower image quality and a wider angle of view than the high quality image and performing high quality image reference fusion processing that generates a fusion image by matching positions of image overlapping regions with each other of the high quality image and the wide angle image after the warping, by a fusion processing unit.

Effects of the Invention

According to this technology, the warping with the high quality image as the reference on the wide angle image having the lower image quality and the wider angle of view than the high quality image, and the processing that synthesizes the high quality image having the higher image quality and the wide angle image after the warping by matching the positions of the image overlapping regions with each other, are performed, so that the fusion image is generated. Thus, the captured image having the wide angle of view and high image quality can be generated without degrading the image quality using the plurality of captured images respectively having different angles of view and image qualities. Note that, the advantageous effects described in this specification are merely examples, and the advantageous effects of the present technology are not limited to them and may include additional effects.

BRIEF DESCRIPTION OF DRAWINGS

FIG. 1 is a diagram illustrating an appearance of a device to which an image processing device is applied.

FIG. 16 is a diagram for explaining integration determination.

FIG. 18 is a diagram illustrating performance of the fusion image generated on the basis of a fusion determination result.

MODE FOR CARRYING OUT THE INVENTION

Figure 2:
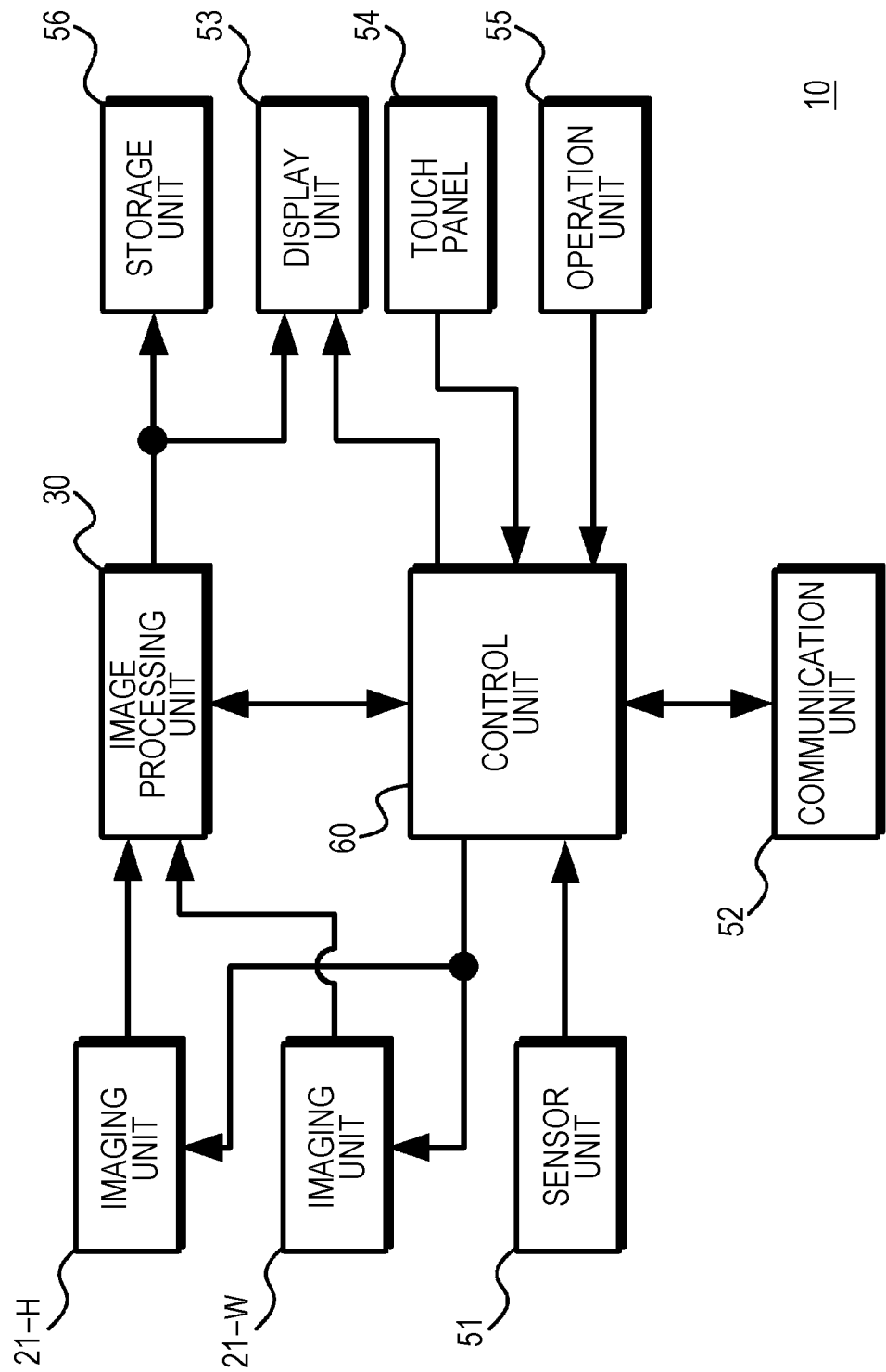
FIG. 2 is a diagram illustrating a configuration of an information processing terminal.

The following is a description of embodiments for carrying out the present technology. Note that, description will be made in the following order.
1. Configuration of device to which image processing device is applied
2. Embodiment of image processing device
2-1. Configuration of embodiment
2-2. Operation of embodiment
3. Other embodiments
4. Application example 1. Configuration of Device to which Image Processing Device is Applied FIG. 1 illustrates an appearance of a device to which an image processing device of this technology is applied. Note that, in the following description, the image processing device is applied to an information processing terminal, for example. The front side of an information processing terminal 10 is illustrated in (a) of FIG. 1, and a display unit 53, a touch panel 54, and an operation unit 55 are provided on the front side. The back side of the information processing terminal 10 is illustrated in (b) of FIG. 1, and a plurality of imaging units, for example, two imaging units 21-H and 21-W are provided on the back side.

FIG. 2 illustrates a configuration of the information processing terminal. The information processing terminal 10 includes the plurality of imaging units, for example, the two imaging units 21-H and 21-W, an image processing unit 30, a sensor unit 51, a communication unit 52, the display unit 53, the touch panel 54, the operation unit 55, a storage unit 56, and a control unit 60. The image processing unit 30 corresponds to the image processing device of this technology.

The imaging units 21-H and 21-W are provided on the same side of the information processing terminal 10 as illustrated in (b) of FIG. 1. The imaging units 21-H and 21-W each are configured by using an imaging element such as a complementary metal oxide semiconductor (CMOS) image sensor, perform photoelectric conversion of light captured by a lens (not illustrated), generate image data of a captured image, and outputs the image data to the image processing unit 30. Furthermore, the imaging units 21-H and 21-W have a characteristic difference, the imaging unit 21-H has a higher image quality than the imaging unit 21-W, and the imaging unit 21-W has a wider angle of view than the imaging unit 21-H.

Figure 3:
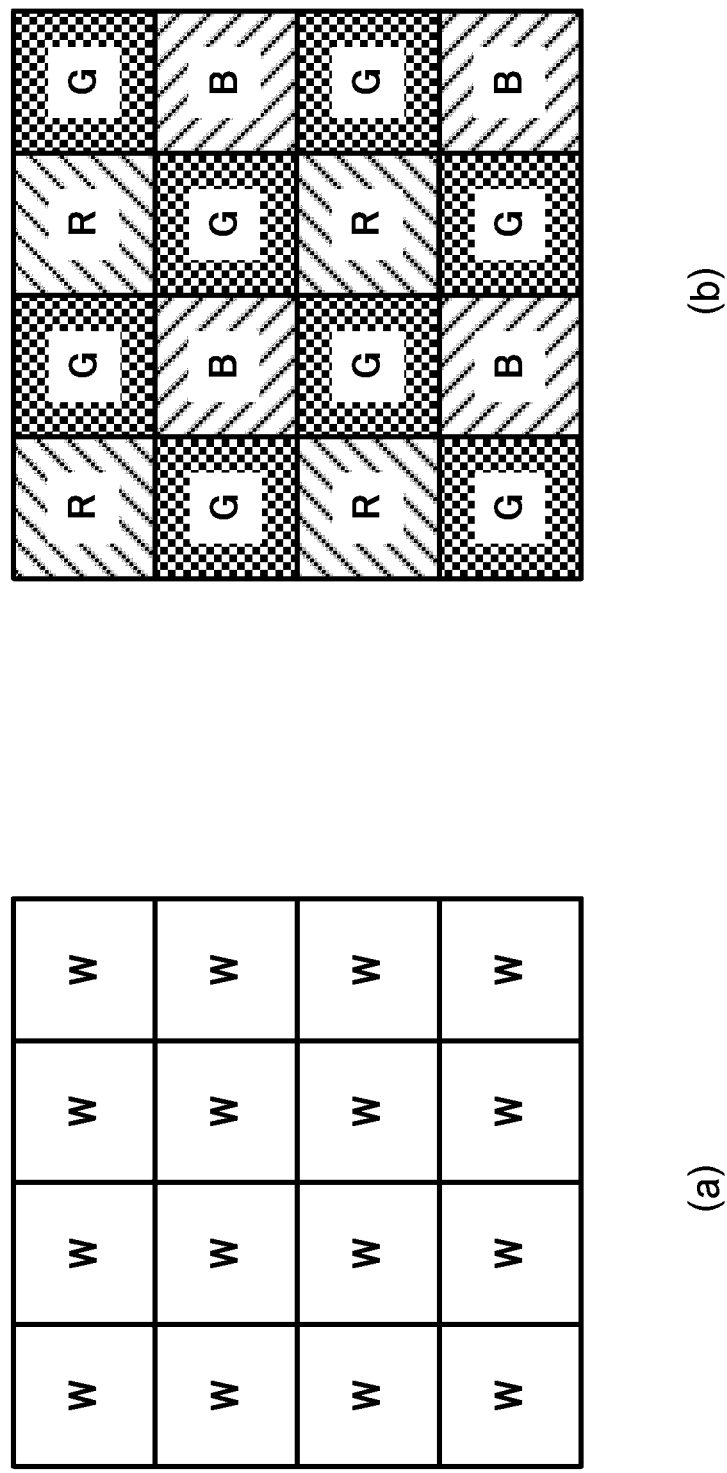
FIG. 3 is a diagram illustrating a pixel arrangement of an imaging unit.

FIG. 3 illustrates a pixel arrangement of the imaging unit. The pixel arrangement of the imaging unit 21-H is illustrated in (a) of FIG. 3. For all pixels, the imaging unit 21-H is configured by white (W) pixels that output electric signals based on the amount of incident light in the entire wavelength region of visible light. Thus, the imaging unit 21-H generates image data of a monochrome captured image.

The pixel arrangement of the imaging unit 21-W is illustrated in (b) of FIG. 3. The imaging unit 21-W is configured by using, for example, a color filter in which red (R) pixels, blue (B) pixels, and green (G) pixels are arranged in a Bayer arrangement. In the Bayer arrangement, two pixels at diagonal positions in a pixel unit of 2×2 pixels are green (G) pixels, and remaining pixels are a red (R) pixel and a blue (B) pixel. In other words, the imaging unit 21-W is configured by color pixels that output electric signals based on the amount of incident light of any one of color components of red, blue and green. Thus, the imaging unit 21-W generates image data of a color captured image in which each pixel indicates one of three primary color (RGB) components.

The image processing unit 30 performs image processing using a captured image having high image quality generated by the imaging unit 21-H and a captured image having a wide angle of view generated by the imaging unit 21-W to generate a captured image having the wide angle of view and high image quality, and outputs the image to the display unit 53 and the storage unit 56. Note that, details of a configuration and operation of the image processing unit 30 will be described later.

The sensor unit 51 is configured by using a gyro sensor, and the like, and detects a shake occurring in the information processing terminal 10. The sensor unit 51 outputs information of the detected shake to the control unit 60.

The communication unit 52 communicates with a device on a network such as a local area network (LAN) or the Internet.

The display unit 53 displays a captured image on the basis of image data supplied from the image processing unit 30, and displays a menu screen, various application screens, and the like on the basis of an information signal from the control unit 60. Furthermore, the touch panel 54 is placed on the display surface side of the display unit 53, and is configured to be able to use a GUI function.

The operation unit 55 is configured by using an operation switch, and the like, generates an operation signal corresponding to user operation, and outputs the signal to the control unit 60.

The storage unit 56 stores information generated by the information processing terminal 10, for example, the image data supplied from the image processing unit 30, and various types of information used for executing communication and applications in the information processing terminal 10.

The control unit 60 includes a central processing unit (CPU), read only memory (ROM), random access memory (RAM) (not illustrated), and the like. The control unit 60 executes a program stored in the ROM or the RAM, and controls operation of each unit so that operation corresponding to the user operation on the touch panel 54 or the operation unit 55 is performed in the information processing terminal 10.

Note that, the information processing terminal 10 is not limited to the configuration illustrated in FIG. 2, and the information processing terminal 10 may include, for example, an encoding processing unit for encoding image data and storing the encoded image data in the storage unit 56, a resolution conversion unit for matching the image data with the resolution of the display unit, and the like.

2. Embodiment of Image Processing Device 2-1. Configuration of Embodiment

The image processing unit 30 performs fusion processing using the monochrome captured image having the high image quality acquired by the imaging unit 21-H and the color captured image having the wide angle of view acquired by the imaging unit 21-W. The image processing unit 30 performs high quality image reference fusion processing as the fusion processing. In a case where the high quality image reference fusion processing is performed, the image processing unit 30 performs warping with the color captured image having a lower image quality and a wider angle of view than the monochrome captured image as a viewpoint of the monochrome captured image, with the monochrome captured image having the high image quality as a reference, and generates a fusion image by matching positions of image overlapping regions with each other of the monochrome captured image and the color captured image after the warping. The image processing unit 30 performs the high quality image reference fusion processing, and generates the fusion image having an angle of view of the imaging unit 21-W, in which an image overlapping region that is a subject region captured by the imaging unit 21-H and the imaging unit 21-W is made to have high image quality corresponding to performance of the imaging unit 21-H.

Figure 4:
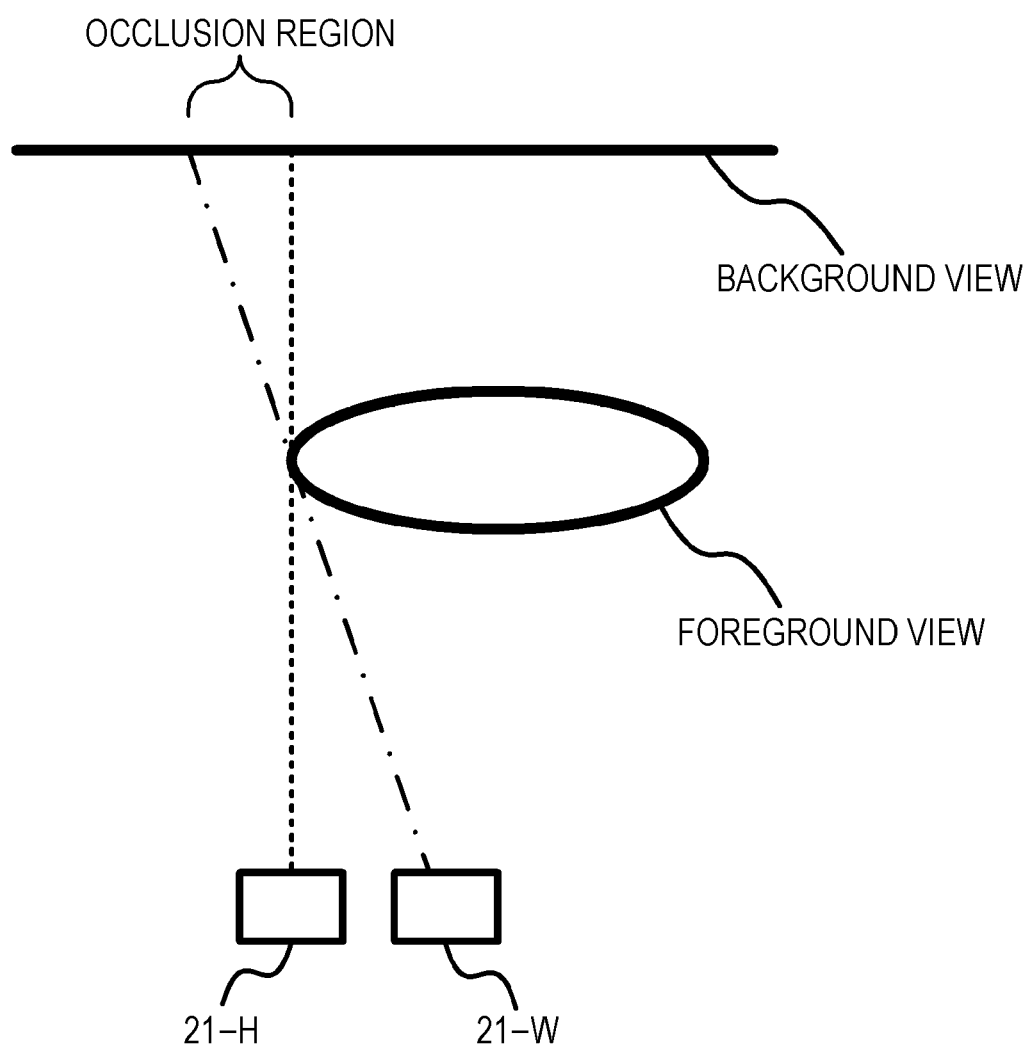
FIG. 4 is a diagram illustrating occlusion when a monochrome captured image is a reference.

Furthermore, since viewpoints are different from each other between the imaging unit 21-H and the imaging unit 21-W, occlusion increases in a close view as compared with a distant view. FIG. 4 illustrates occlusion when the monochrome captured image acquired by the imaging unit 21-H is the reference. When the occlusion occurs due to parallax, there is no image data corresponding to an occlusion region in the color captured image acquired by the imaging unit 21-W. For this reason, in the fusion image generated by the fusion processing with the monochrome captured image as the reference, color information is missing in the occlusion region, and image quality of the fusion image may be degraded as compared with that in the color captured image acquired by the imaging unit 21-W.

Figure 5:
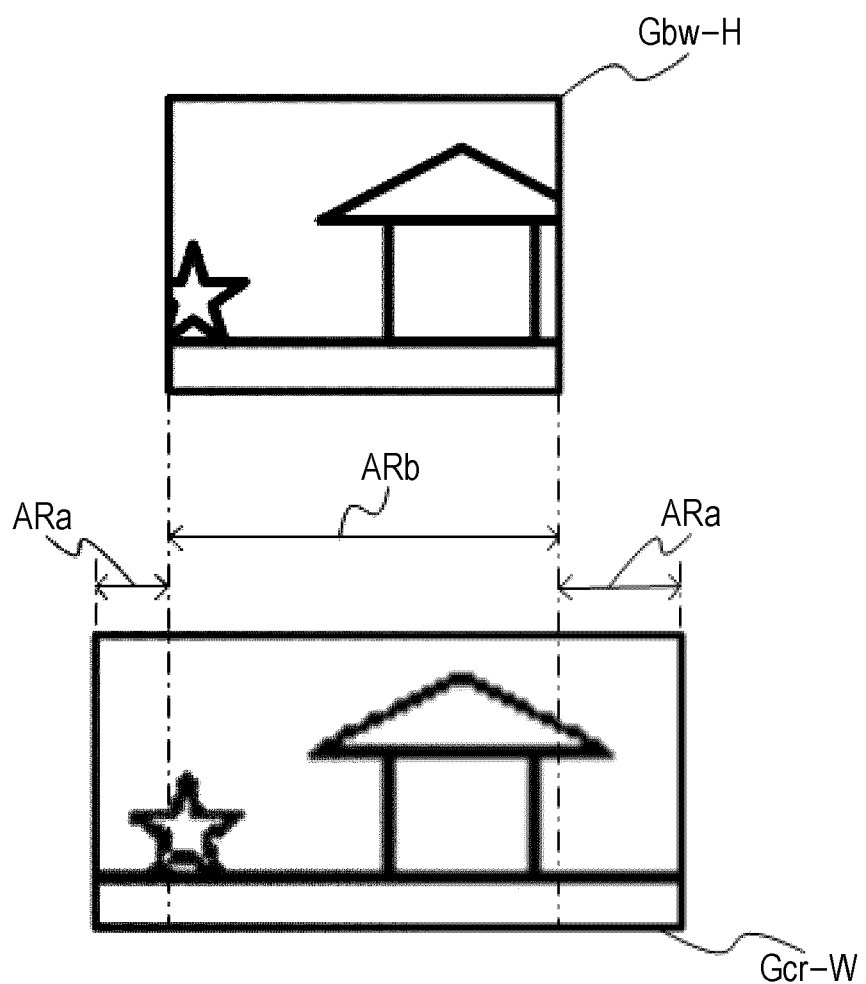
FIG. 5 is a diagram illustrating captured images used for generating a fusion image.

Furthermore, angles of view are different from each other between the imaging unit 21-H and the imaging unit 21-W. Thus, as illustrated in FIG. 5, captured images used for generating the fusion image include an image non-overlapping region (hereinafter referred to as a "frame region") ARa indicated by only the color captured image having the wide angle of view acquired by the imaging unit 21-W, and an image overlapping region ARb indicated by a monochrome captured image Gbw-H having the high image quality acquired by the imaging unit 21-H and a color captured image Gcr-W acquired by the imaging unit 21-W. Furthermore, when luminances are different from each other between the monochrome captured image Gbw-H and the color captured image Gcr-W due to a sensitivity difference, an exposure difference, or the like between the imaging unit 21-H and the imaging unit 21-W, in the fusion image generated by the fusion processing with the monochrome captured image as the reference, a boundary becomes conspicuous due to a luminance difference between the frame region ARa and the image overlapping region ARb.

The image processing unit 30 therefore determines whether a predetermined condition is satisfied, and in a case where it is determined that the predetermined condition is satisfied, in other words, in a case where it is determined that image quality degradation does not occur due to a subject distance, the luminance difference, or the like, the image processing unit 30 performs the high quality image reference fusion processing.

Furthermore, in a case where it is determined that the predetermined condition is not satisfied, in other words, in a case where it is determined that the image quality degradation occurs due to at least one of the subject distance, the luminance difference, or the like, the image processing unit 30 performs wide angle image reference fusion processing. In a case where the wide angle image reference fusion processing is performed, the image processing unit 30 performs warping with the monochrome captured image having the high image quality as a viewpoint of the color captured image, with the color captured image having the wide angle of view as a reference, and generates a fusion image by matching positions of image overlapping regions with each other of the color captured image and the monochrome captured image after the warping. The image processing unit 30 performs such a wide angle image reference fusion processing to prevent image quality degradation due to the subject distance, the luminance difference, or the like.

Figure 6:
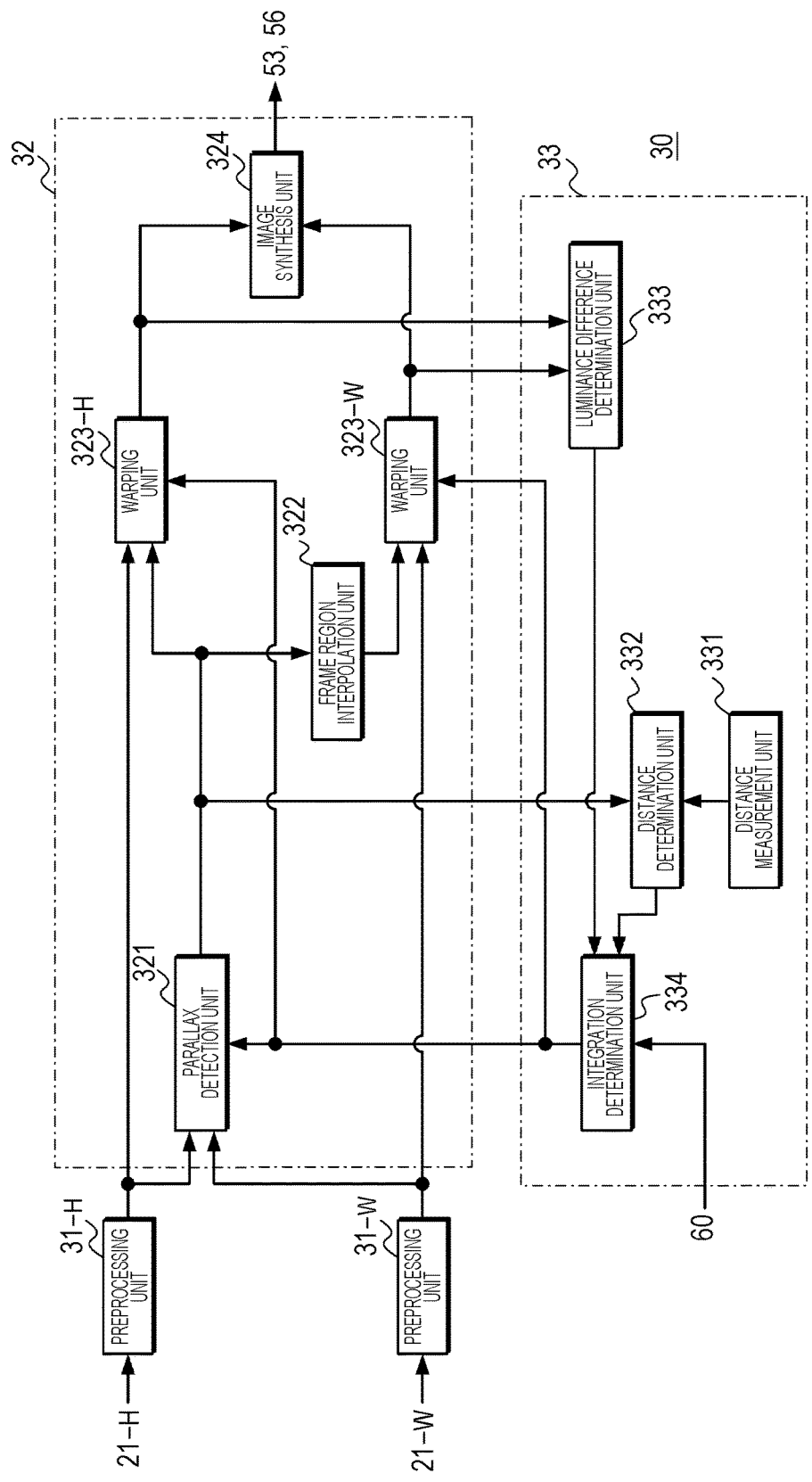
FIG. 6 is a diagram illustrating a configuration of an embodiment.

FIG. 6 illustrates a configuration of an embodiment. The image processing unit 30 includes preprocessing units 31-H and 31-W, a fusion processing unit 32, and a determination unit 33. Furthermore, the fusion processing unit 32 includes a parallax detection unit 321, a frame region interpolation unit 322, warping units 323-H and 323-W, and an image synthesis unit 324, and the determination unit 33 includes a distance measurement unit 331, a distance determination unit 332, a luminance difference determination unit 333, and an integration determination unit 334.

The preprocessing unit 31-H performs correction processing such as lens distortion correction and defective pixel correction on the image data of the monochrome captured image acquired by the imaging unit 21-H. The preprocessing unit 31-H outputs the image data after the correction (hereinafter referred to as "monochrome image data") to the fusion processing unit 32.

The preprocessing unit 31-W performs correction processing such as lens distortion correction and defective pixel correction on the image data of the color captured image acquired by the imaging unit 21-W. Furthermore, the preprocessing unit 31-W performs demosaic processing using the image data after the correction processing. In the demosaic processing, three primary color image data indicating each color component of red, blue, and green is generated for each pixel from imaging data in which each pixel indicates one of the color components of red, blue, and green. Moreover, the preprocessing unit 31-W performs color space conversion of the three primary color image data, generates color image data including color difference data and luminance data that is a component equal to a monochrome image, and outputs the generated data to the fusion processing unit 32.

The parallax detection unit 321 of the fusion processing unit 32 performs parallax detection on the basis of the monochrome image data supplied from the preprocessing unit 31-H and the color image data supplied from the preprocessing unit 31-W, and generates parallax information indicating parallax detected. Since the imaging unit 21-H and the imaging unit 21-W perform imaging from different viewpoint positions as illustrated in (b) of FIG. 1, the captured images acquired by the imaging unit 21-H and the imaging unit 21-W are images having parallax. Thus, the parallax detection unit 321 generates parallax information indicating parallax for each pixel on the basis of the image data supplied from the preprocessing unit 31-H and the preprocessing unit 31-W.

The parallax detection unit 321 performs parallax detection using the monochrome image data and the color image data, and generates parallax information indicating parallax between the monochrome captured image and the color captured image. Furthermore, in generation of the parallax information, the parallax detection unit 321 uses the monochrome captured image or the color captured image as a reference on the basis of fusion determination information supplied from the determination unit 33 as described later. For example, in a case where it is indicated by the fusion determination information that fusion processing with the color captured image as the reference (wide angle image reference fusion processing) is performed, the parallax detection unit 321 generates parallax information with the color captured image as a reference image. Furthermore, in a case where it is indicated by the fusion determination information that fusion processing with the monochrome captured image as the reference (high quality image reference fusion processing) is performed, the parallax detection unit 321 generates parallax information with the monochrome captured image as a reference image. The parallax detection unit 321 performs corresponding point detection processing such as block matching to generate parallax information, for example. For example, the parallax detection unit 321 detects a block region on the other captured image most similar to a reference block region with a target position on a reference captured image as a reference. Furthermore, the parallax detection unit 321 calculates a parallax vector indicating a difference between positions of the block region detected and the reference block region. Moreover, the parallax detection unit 321 calculates a parallax vector with each pixel on the reference captured image as a target position, and generates parallax information indicating the parallax vector calculated for each pixel. The parallax detection unit 321 outputs the generated parallax information to the frame region interpolation unit 322, the warping unit 323-H, and the determination unit 33.

In a case where it is indicated by the fusion determination information supplied from the determination unit 33 that the high quality image reference fusion processing with the monochrome captured image as the reference is performed, the frame region interpolation unit 322 generates parallax information on the frame region by interpolation processing. Since the color captured image has the wider angle of view than the monochrome captured image, the parallax information generated by the parallax detection unit 321 does not include parallax information on the frame region not included in the monochrome captured image in the color captured image. Thus, the frame region interpolation unit 322 generates the parallax information on the frame region by interpolation processing using the parallax information generated with the monochrome captured image as the reference so that warping can be performed with the color captured image as the image of the viewpoint of the monochrome captured image.

The warping unit 323-H performs warping of the monochrome captured image on the basis of the fusion determination information from the determination unit 33. In a case where it is indicated by the fusion determination information that the wide angle image reference fusion processing is performed, the warping unit 323-H performs warping with the monochrome captured image as the image of the viewpoint of the color captured image. The warping unit 323-H generates, from the monochrome image data, monochrome image data of the viewpoint of the color captured image, and outputs the generated data to the image synthesis unit 324. Furthermore, in a case where it is indicated by the fusion determination information that the high quality image reference fusion processing is performed, the warping unit 323-H outputs the monochrome image data before changing the viewpoint to the image synthesis unit 324.

The warping unit 323-W performs warping of the color captured image on the basis of the fusion determination information from the determination unit 33. In a case where it is indicated by the fusion determination information that the high quality image reference fusion processing is performed, the warping unit 323-W performs warping with the color captured image as the image of the viewpoint of the monochrome captured image. The warping unit 323-W generates, from the color image data, color image data of the viewpoint of the monochrome captured image, and outputs the generated data to the image synthesis unit 324. Furthermore, in a case where it is indicated by the fusion determination information that the wide angle image reference fusion processing is performed, the warping unit 323-W outputs the color image data before changing the viewpoint to the image synthesis unit 324.

The image synthesis unit 324 performs synthesis of the monochrome captured image and the color captured image. The image synthesis unit 324 matches positions of image overlapping regions with each other of the monochrome image data output from the warping unit 323-H and the color image data output from the warping unit 323-W, and then synthesizes luminance image data of the monochrome image data and the color image data. The image synthesis unit 324 outputs color image data including the color difference data and the luminance data after the synthesis as image data of the fusion image.

The determination unit 33 determines whether or not the predetermined condition related to image quality degradation in generation of the fusion image is satisfied, generates fusion determination information on the basis of a determination result, and outputs the fusion determination information to the fusion processing unit 32. Furthermore, the determination unit 33 generates the fusion determination information on the basis of setting information corresponding to the user operation. For example, the determination unit 33 sets that the subject distance determined on the basis of the parallax information is longer than the determination threshold value, as the predetermined condition. Furthermore, the determination unit 33 sets that a luminance difference between the high quality image and the wide angle image is equal to or less than the determination threshold value, as the predetermined condition, for example.

The distance measurement unit 331 of the determination unit 33 generates distance measurement information of the subject. The distance measurement unit 331 may be provided in the imaging unit 21-H or the imaging unit 21-W, or may be provided separately from the imaging units. Furthermore, the distance measurement unit 331 may generate the distance measurement information by using either a passive method or an active method. In a case where the distance measurement unit using the passive method is provided in the imaging unit, for example, the imaging unit uses an imaging element provided with an image plane phase difference detection pixel on its imaging plane. The image plane phase difference detection pixel individually generates image signals of one image and the other image divided by pupil division. The distance measurement unit detects a phase difference between one image and the other image by using the image signals generated by the image plane phase difference detection pixel, and calculates the subject distance that is a distance to the subject on the basis of the phase difference. Furthermore, in a case where the distance measurement unit using the passive method is provided separately from the imaging unit, for example, in the distance measurement unit, a pair of line sensors is provided separately from the imaging unit, and one image and the other image divided by pupil division are formed on the pair of line sensors. The distance measurement unit detects a phase difference between the images formed on the pair of line sensors, and calculates the subject distance on the basis of the phase difference. Moreover, in a case where the active method is used, the distance measurement unit 331 outputs light or radio waves, and measures the subject distance that is a distance to the subject on the basis of reflected light or radio waves.

The distance measurement unit 331 outputs the distance measurement information indicating the subject distance to the distance determination unit 332. Furthermore, the distance measurement unit 331 may generate a depth map indicating a depth of field for each pixel in the captured image, and output the depth map as the distance measurement information to the distance determination unit 332.

The distance determination unit 332 determines the reference image in the fusion processing on the basis of the distance measurement information generated by the distance measurement unit 331. The distance determination unit 332 determines that the reference image in generation of the fusion image is the color captured image in a case where the subject distance of the subject in a close view detection region set in advance is equal to or less than the determination threshold value, and determines that the reference image is the monochrome captured image in a case where the subject distance is longer than the determination threshold value. Note that, the close view detection region will be described later. The distance determination unit 332 outputs a reference image determination result based on the subject distance to the integration determination unit 334.

The luminance difference determination unit 333 determines the reference image in the fusion processing on the basis of the monochrome captured image output from the warping unit 323-H and the color captured image output from the warping unit 323-W. The luminance difference determination unit 333 sets a predetermined range from the boundary with the frame region in the image overlapping region as a luminance calculation region, and calculates, for example, an average luminance value of the luminance calculation region for the monochrome captured image and the color captured image. Moreover, the luminance difference determination unit 333 determines that the reference image is the color captured image in a case where a difference between the average luminance values respectively calculated for the monochrome captured image and the color captured image is greater than the determination threshold value, and determines that the reference image is the monochrome captured image in a case where the difference between the average luminance values is equal to or less than the determination threshold value. The luminance difference determination unit 333 outputs a reference image determination result based on the luminance difference to the integration determination unit 334.

The integration determination unit 334 determines what type of fusion processing is performed on the basis of the reference image determination results of the distance determination unit 332 and the luminance difference determination unit 333, and the setting information corresponding to the user operation supplied from the control unit 60. On the basis of the reference image determination result and the setting information, the integration determination unit 334 determines which processing is performed of the high quality image reference fusion processing, the wide angle image reference fusion processing, or the narrow angle fusion processing. Furthermore, on the basis of the reference image determination result, the integration determination unit 334 determines which processing is performed of the high quality image reference fusion processing or the wide angle image reference fusion processing during operation imaging, for example. Note that, in the narrow angle fusion processing, warping with the monochrome captured image as a reference is performed by using the color captured image, and the monochrome captured image and the color captured image after the warping are synthesized by matching the positions of the image overlapping regions with each other, whereby the fusion image is generated having an angle of view of the monochrome captured image. The integration determination unit 334 outputs the fusion determination information indicating a determination result of the fusion processing to the fusion processing unit 32. Thus, in the fusion processing unit 32, on the basis of the determination result of the determination unit 33, in other words, the fusion determination information, the high quality image reference fusion processing, the wide angle image reference fusion processing, or the narrow angle fusion processing is selectively performed so that the fusion image having the high image quality can be generated.

2-2. Operation of Embodiment

Figure 7:
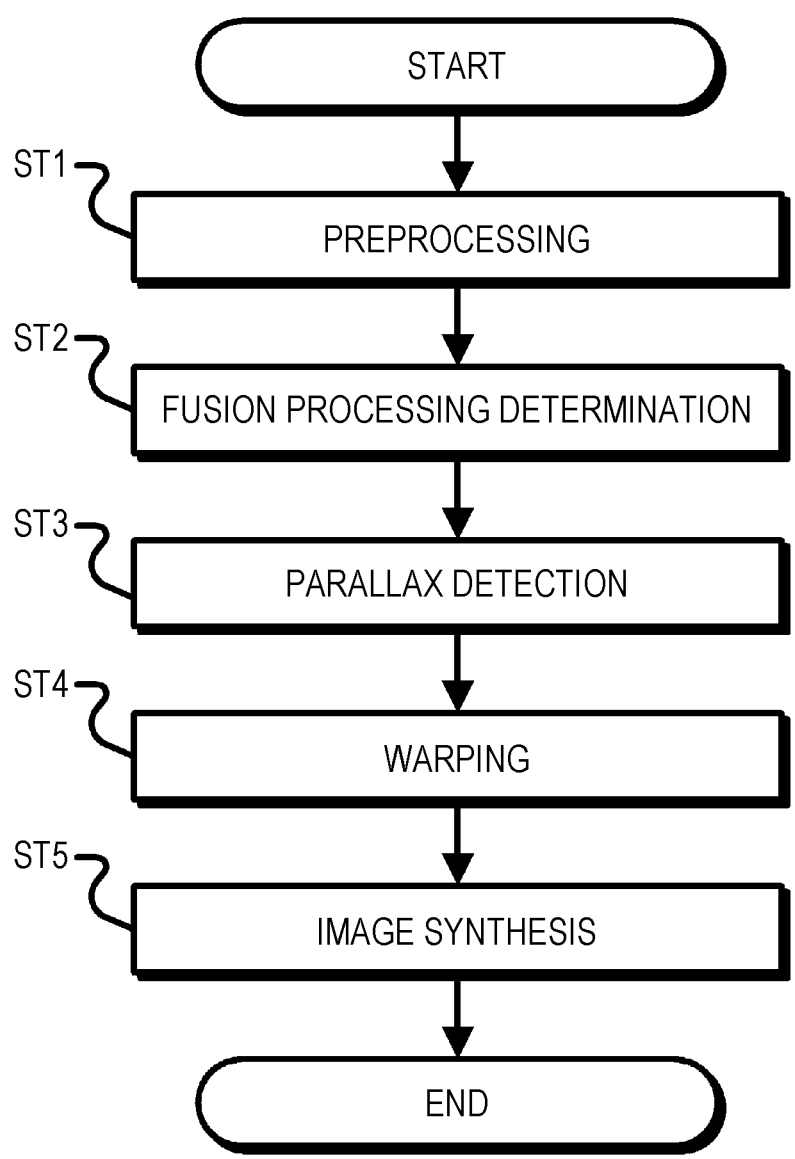
FIG. 7 is a flowchart illustrating operation of an embodiment of an image processing unit.

FIG. 7 is a flowchart illustrating operation of an embodiment of the image processing unit. In step ST1, the image processing unit performs preprocessing. The preprocessing units 31-H and 31-W of the image processing unit 30 acquire the image data of the captured images from the imaging units 21-H and 21-W, respectively, and perform correction processing such as lens distortion correction and defective pixel correction. Moreover, the preprocessing unit 31-W performs demosaic processing, color space conversion processing, and the like using the image data of the color captured image acquired from the imaging unit 21-W, and generates color image data including the luminance data that is the component equal to the monochrome captured image acquired from the imaging unit 21-H and the color difference data. The preprocessing units 31-H and 31-W of the image processing unit 30 perform the preprocessing using image data of the monochrome captured image and the color captured image, and proceed to step ST2.

Figure 8:
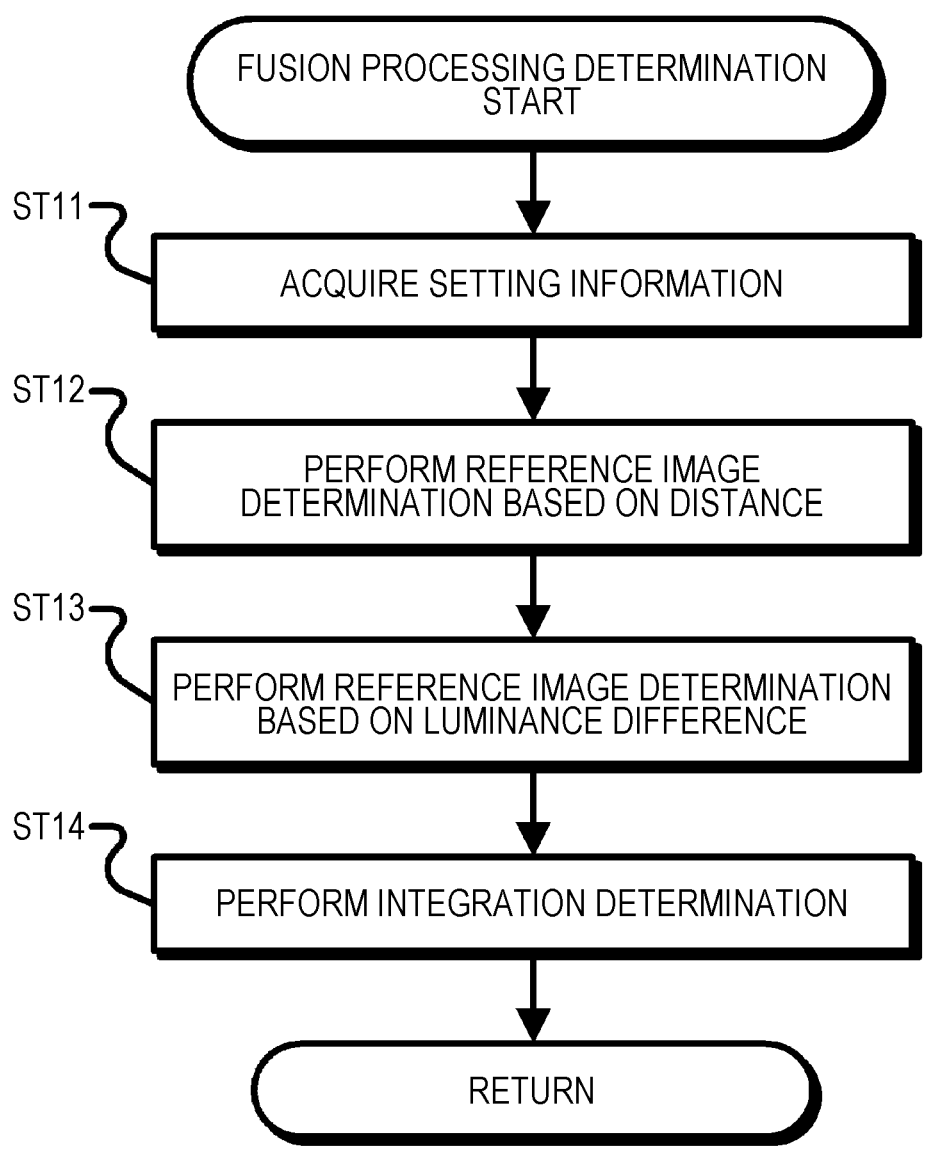
FIG. 8 is a flowchart illustrating fusion processing determination.

In step ST2, the image processing unit performs fusion processing determination. The determination unit 33 of the image processing unit 30 determines which processing is performed of the high quality image reference fusion processing, the wide angle image reference fusion processing, or the narrow angle fusion processing on the basis of user's setting operation and determination results of the distance determination unit and the luminance difference determination unit, and generates the fusion determination information indicating the determination result. FIG. 8 is a flowchart illustrating the fusion processing determination.

In step ST11, the image processing unit acquires the setting information. The determination unit 33 of the image processing unit 30 acquires from the control unit 60 the setting information corresponding to the user operation, for example, information indicating which of a moving image and a still image is generated, information indicating a generation mode of the fusion image, and the like, and proceeds to step ST12.

Figure 9:
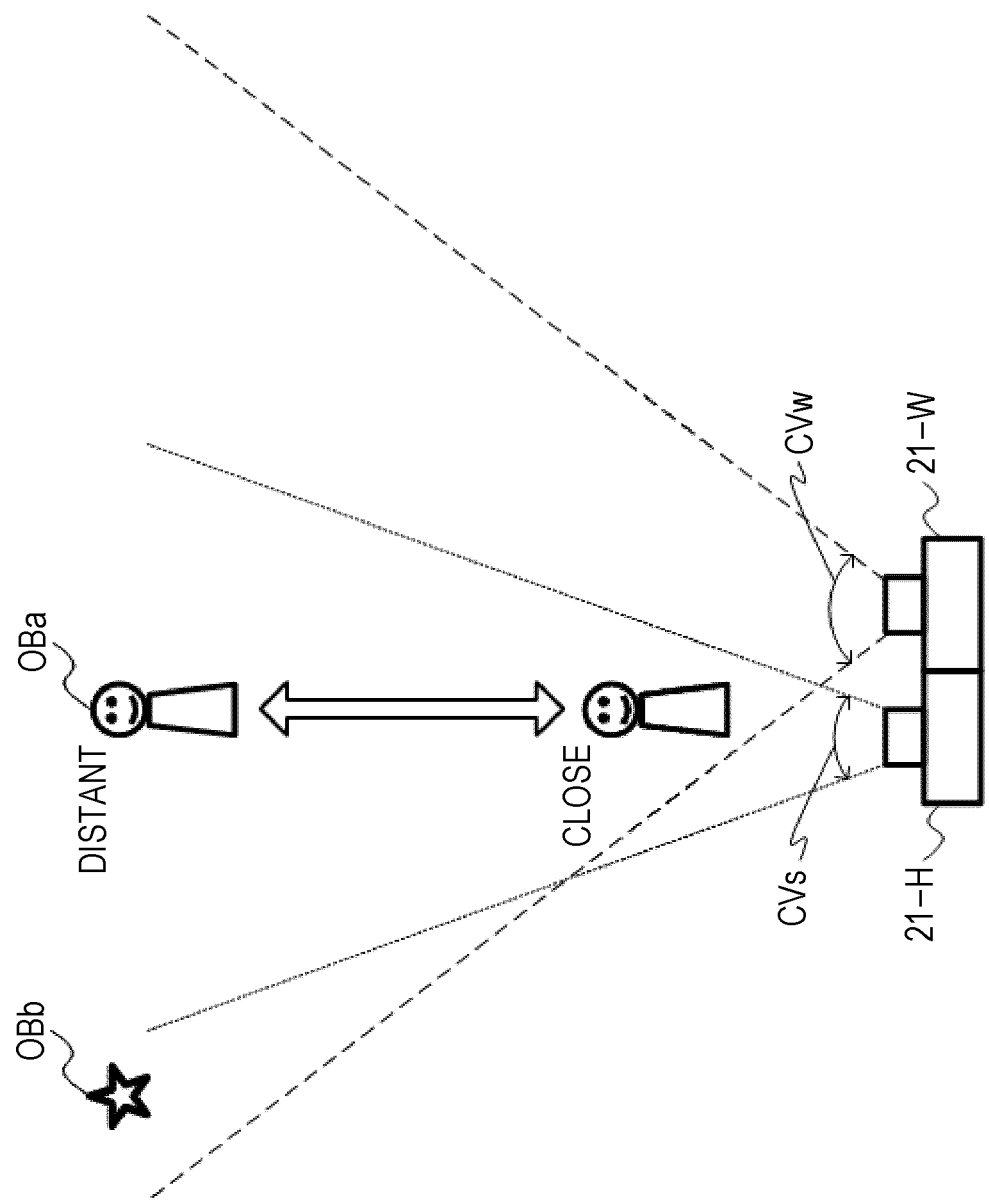
FIG. 9 is a diagram schematically illustrating a positional relationship between imaging units and subjects.
Figure 10:
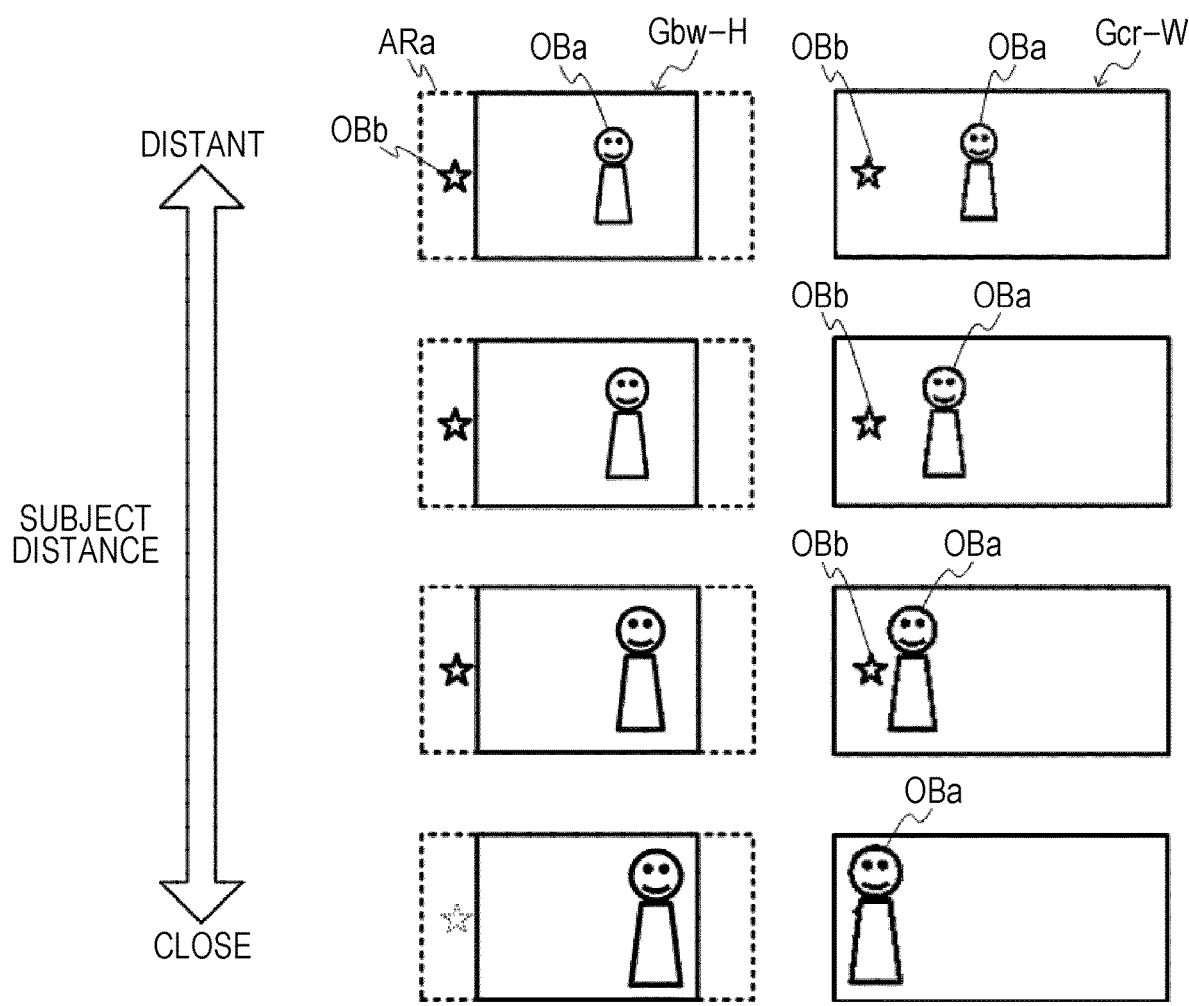
FIG. 10 is a diagram illustrating a relationship between a subject distance and captured images acquired by the imaging units.

In step ST12, the image processing unit performs reference image determination based on the distance. FIGS. 9 and 10 are diagrams for explaining the reference image determination based on the distance. FIG. 9 schematically illustrates a positional relationship between the imaging units and subjects, the imaging unit 21-H is arranged on the left side of a subject OBa, and the imaging unit 21-W is arranged on the right side of the subject OBa. Furthermore, a subject OBb is provided at a distant position. An angle of view CVs of the imaging unit 21-H is a normal angle of view, and an angle of view CVw of the imaging unit 21-W is wider than the normal angle of view and is a wide angle of view.

Figure 11:
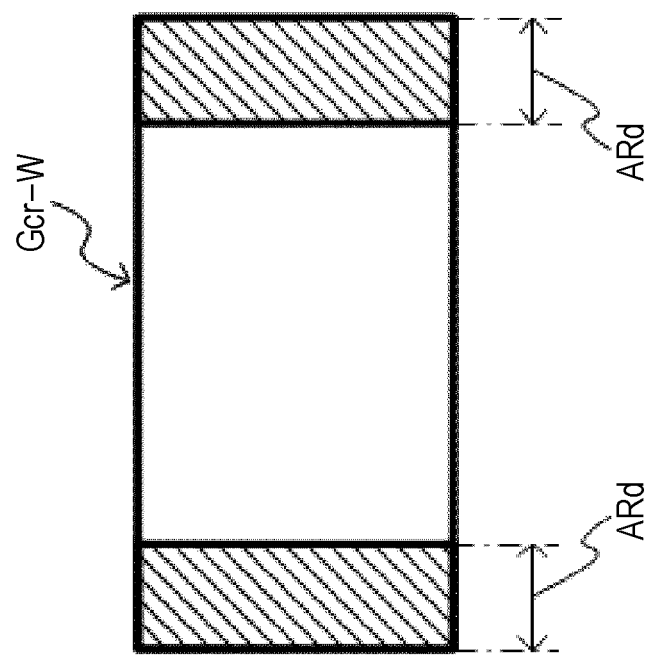
FIG. 11 is a diagram illustrating a close view detection region.

FIG. 10 illustrates a relationship between the subject distance and the captured images acquired by the imaging units. When a distance to the subject OBa becomes shorter, a position of the subject OBa moves in the right direction in the monochrome captured image Gbw-H obtained by the imaging unit 21-H, and the position of the subject OBa moves in the left direction in the color captured image Gcr-W obtained by the imaging unit 21-W. Furthermore, when the distance to the subject OBa becomes shorter, the subject OBb is hidden by the subject OBa in the color captured image Gcr-W. In a case where the fusion image having the wide angle of view is generated with the monochrome captured image Gbw-H as a reference, the image processing unit needs to use the color captured image Gcr-W for the frame region ARa indicated by the broken line. Here, when the distance to the subject OBa is short and the subject OBb is hidden by the subject OBa in the color captured image Gcr-W, the subject OBb cannot be displayed in the frame region ARa in the fusion image. Thus, as illustrated in FIG. 11, the image processing unit sets a close view detection region ARd for the color captured image Gcr-W that is the wide angle of view, and switches the reference image depending on whether or not the subject distance of the subject included in the close view detection region ARd is longer than the determination threshold value set in advance. Note that, in a case where the fusion image having the wide angle of view is generated with the monochrome captured image as the reference, the color captured image is used for the frame region. Thus, the frame region is set as the close view detection region and the determination threshold value is set in advance so that it is possible to determine whether there is a possibility that a distant subject is hidden by a close subject in the frame region.

Figure 12:
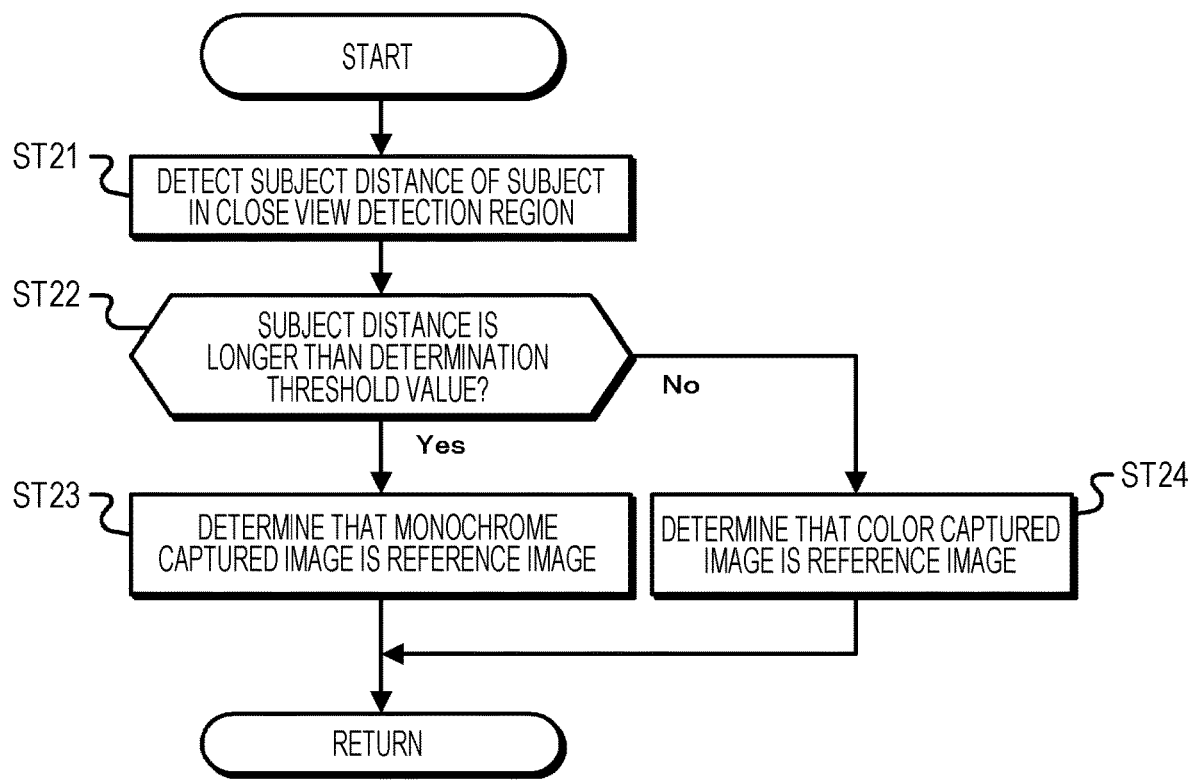
FIG. 12 is a flowchart illustrating reference image determination based on distance.

FIG. 12 is a flowchart illustrating the reference image determination based on the distance. In step ST21, the determination unit detects the subject distance of the subject in the close view detection region. The determination unit 33 detects the subject distance of the subject in the close view detection region (for example, the frame region) in the color captured image by using the passive method or active method distance measurement sensor, the depth map, or the like, and proceeds to step ST22.

In step ST22, the determination unit determines whether the subject distance is longer than the determination threshold value. The determination unit 33 proceeds to step ST23 in a case where the subject distance detected in step ST21 is longer than the determination threshold value, and proceeds to step ST24 in a case where the distance is equal to or less than the determination threshold value.

In step ST23, the determination unit determines that the monochrome captured image is the reference image. In the case where the subject distance is longer than the determination threshold value, the fusion image generated with the monochrome captured image as the reference image has less occlusion region because the subject is apart, so that a failure in an image of the frame region is inconspicuous. Thus, the determination unit 33 determines that the monochrome captured image is the reference image.

In step ST24, the determination unit determines that the color captured image is the reference image. In a case where the subject distance is equal to or less than the determination threshold value and the subject is close, in the fusion image generated with the monochrome captured image as the reference image, the subject is close and the occlusion region increases, whereby the failure in the image in the frame region becomes conspicuous. Thus, the determination unit 33 determines that the color captured image is the reference image.

As described above, the image processing unit determines which of the monochrome captured image and the color captured image is set as the reference image on the basis of the subject distance in the close view detection region, and proceeds to step ST13 in FIG. 8.

Figure 13:
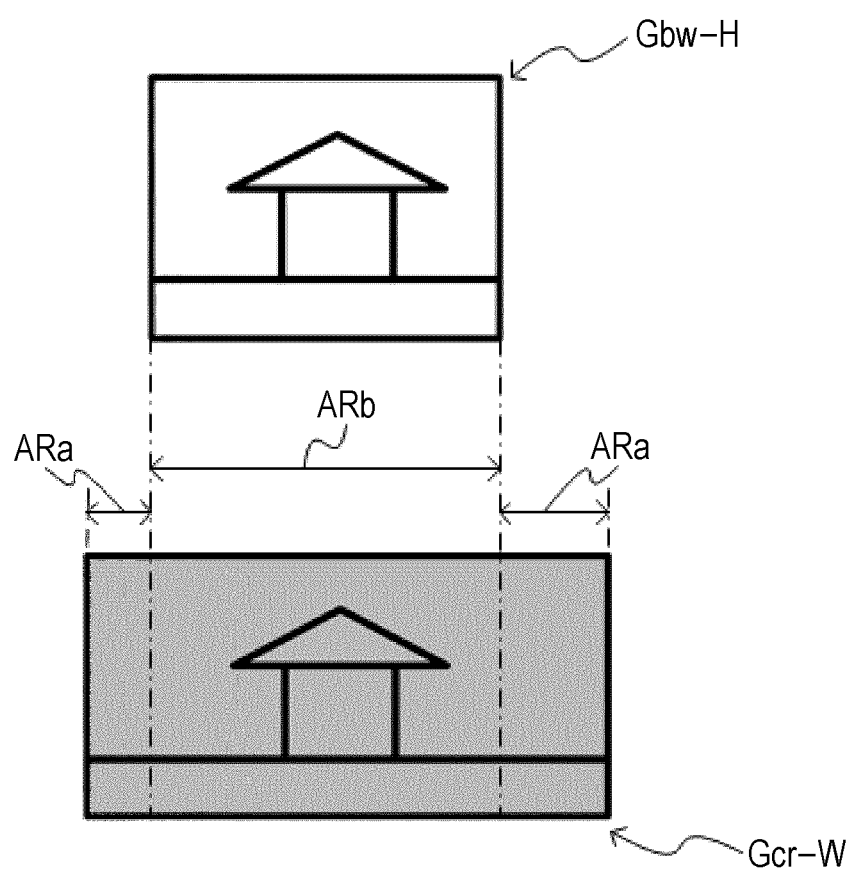
FIG. 13 is a diagram for explaining reference image determination based on luminance difference.

In step ST13, the image processing unit performs the reference image determination based on the luminance difference. FIG. 13 is a diagram for explaining the reference image determination based on the luminance difference. In FIG. 13, the monochrome captured image and the color captured image are illustrated, and for example, the monochrome captured image Gbw-H is a brighter image than the color captured image Gcr-W.

Figure 14:
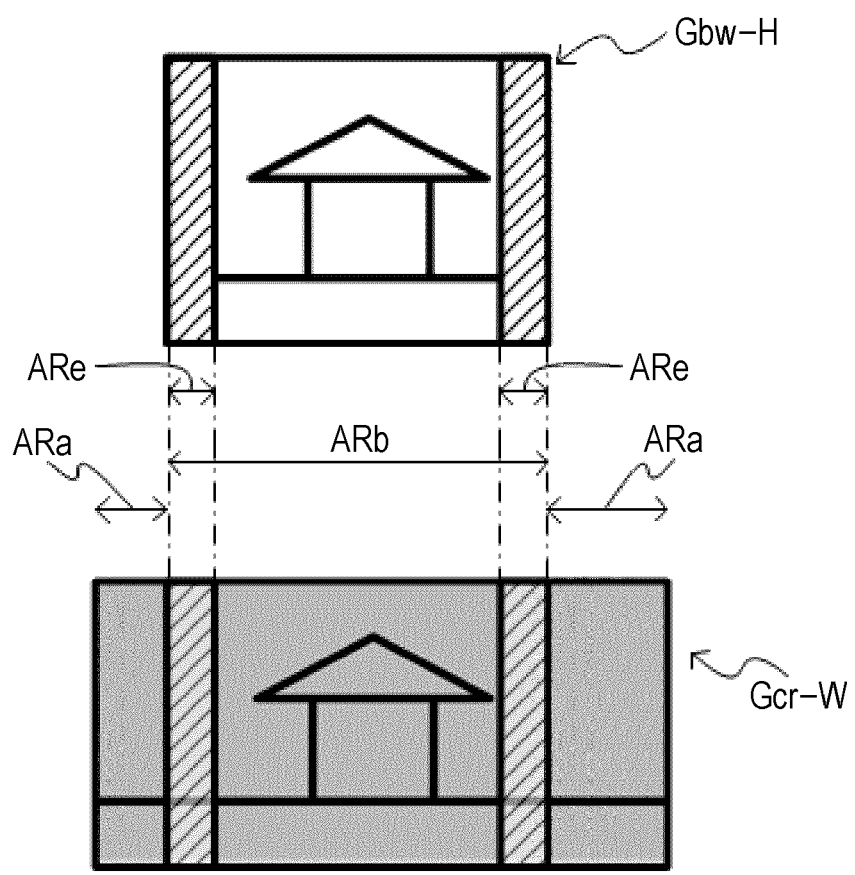
FIG. 14 is a diagram illustrating a luminance calculation region.

In a case where the monochrome captured image having the high image quality and the color captured image having the wide angle of view are synthesized in the image processing unit, when the luminance of the monochrome captured image Gbw-H is different from the luminance of the color captured image Gcr-W, in the fusion image, the luminance difference becomes remarkable at the boundary between the frame region ARa and the image overlapping region ARb. Thus, as illustrated in FIG. 14, a predetermined range from the boundary with the frame region ARa in the image overlapping region ARb is set as a luminance calculation region ARe, and the image processing unit calculates, for example, an average luminance value of the luminance calculation region ARe in the monochrome captured image Gbw-H and the color captured image Gcr-W. Furthermore, the image processing unit performs setting of the reference image depending on whether or not the luminance difference that is a difference between an average luminance value calculated from the monochrome captured image and an average luminance value calculated from the color captured image is equal to or less than the determination threshold value set in advance.

Figure 15:
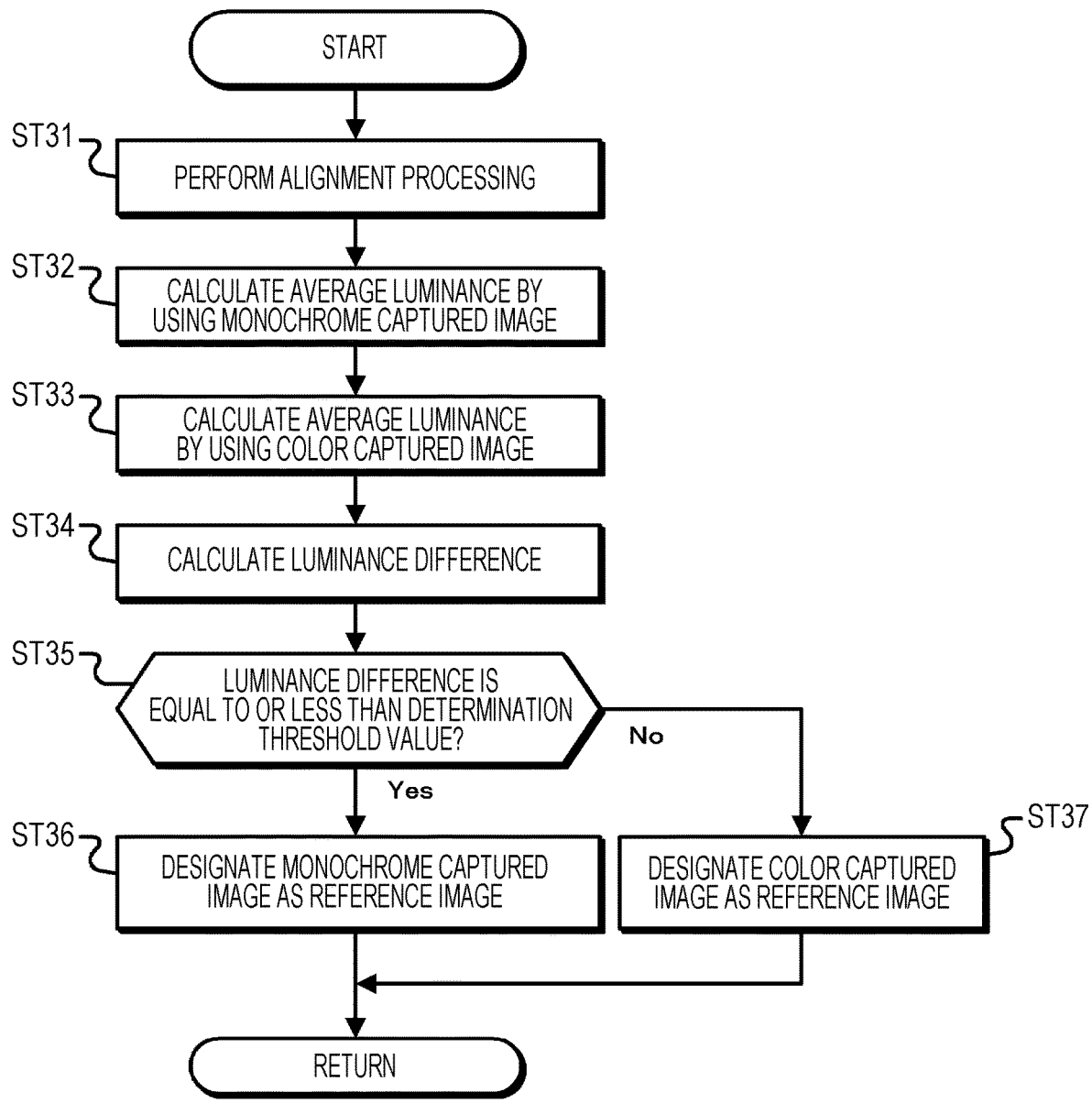
FIG. 15 is a flowchart illustrating the reference image determination based on the luminance difference.

FIG. 15 is a flowchart illustrating the reference image determination based on the luminance difference. In step ST31, the determination unit performs alignment processing. The determination unit 33 performs alignment between the monochrome captured image and the color captured image so that the positions are matched with each other of the image overlapping regions of the monochrome captured image and the color captured image, and proceeds to step ST32.

In step ST32, the determination unit calculates the average luminance by using the monochrome captured image. The determination unit 33 calculates the average luminance of the luminance calculation region ARe in the monochrome captured image, and proceeds to step ST33.

In step ST33, the determination unit calculates the average luminance by using the color captured image. The determination unit 33 calculates the average luminance of the luminance calculation region ARe in the color captured image, and proceeds to step ST34.

In step ST34, the determination unit calculates the luminance difference. The determination unit 33 calculates the luminance difference between the average luminance calculated in step ST32 and the average luminance calculated in step ST33, and proceeds to step ST35.

In step ST35, the determination unit determines whether the luminance difference is equal to or less than the determination threshold value. The determination unit 33 proceeds to step ST36 in a case where the luminance difference calculated in step ST34 is equal to or less than the determination threshold value, and proceeds to step ST37 in a case where the luminance difference is greater than the determination threshold value.

In step ST36, the determination unit determines that the monochrome captured image is the reference image. In the case where the luminance difference is equal to or less than the determination threshold value, the fusion image generated with the monochrome captured image as the reference image has less luminance difference between an overlapping image portion and a non-overlapping image portion, and the boundary is not conspicuous. Thus, the determination unit 33 determines that the monochrome captured image is the reference image.

In step ST37, the determination unit determines that the color captured image is the reference image. In the case where the luminance difference is greater than the determination threshold value, the fusion image generated with the monochrome captured image as the reference image has a large luminance difference between the image overlapping region and the image non-overlapping region (frame region), so that the boundary of the region is conspicuous. Thus, the determination unit 33 determines that the color captured image is the reference image.

As described above, the image processing unit determines which of the monochrome captured image and the color captured image is set as the reference image on the basis of the luminance difference between the monochrome captured image and the color captured image, and proceeds to step ST14 in FIG. 8.

In step ST14, the image processing unit performs integration determination. The determination unit 33 of the image processing unit 30 determines what type of fusion processing is performed on the basis of the setting information acquired in step ST11 and the determination results obtained in step ST12 and step ST13, and generates the fusion determination information.

FIG. 16 is a diagram for explaining the integration determination, and (a) of FIG. 16 illustrates a case where the moving image is generated as the fusion image, and (b) of FIG. 16 illustrates a case where the still image is generated as the fusion image.

The determination unit 33 generates the fusion determination information on the basis of (a) of FIG. 16 in a case where it is determined, according to the setting information acquired, that the user has selected generation of the moving image, and generates the fusion determination information on the basis of (b) of FIG. 16 in a case where it is determined that the user has selected generation of the still image.

In the generation of the moving image, the angle of view is not changed during imaging. Thus, in a case where the user has selected the generation of the moving image and a mode (wide angle mode) for generating the fusion image having the wide angle of view, the determination unit 33 sets the angle of view to the wide angle of view, and switches the reference image on the basis of the determination result of the distance and the determination result of the luminance difference. In a case where it is determined that the monochrome captured image is the reference image in both of the determination result of the distance and the determination result of the luminance difference, for example, the determination unit 33 sets the high quality image reference fusion processing as the fusion processing, the monochrome captured image as the reference image, and the wide angle of view as the angle of view. Furthermore, in a case where the color captured image is set as the reference image in at least one of the determination result of the distance or the determination result of the luminance difference, the determination unit 33 sets the wide angle image reference fusion processing as the fusion processing, the color captured image as the reference image, and the wide angle of view as the angle of view.

Furthermore, in the generation of the moving image, in a case where it cannot be allowed that the image quality is degraded by setting the color captured image as the reference image as compared with a case where the monochrome captured image is set as the reference image, the determination unit 33 is enabled to select an image quality priority mode. In the image quality priority mode, regardless of whether or not the predetermined condition is satisfied, the narrow angle fusion processing is set as the fusion processing, the monochrome captured image is set as the reference image, and a narrow angle of view (normal angle of view that is an angle of view of the monochrome captured image) is set as the angle of view. If the angle of view is set to the narrow angle of view as described above, the fusion image is not affected by the close subject in the close view detection region and the luminance difference between the image overlapping region and the frame region.

In the generation of the still image, the reference image and the angle of view may be set using the analysis result of the captured image to generate the fusion image. For example, the generation of the still image is provided with the mode (wide angle mode) for generating the fusion image having the wide angle of view, and a mode (normal angle mode) for generating the fusion image having the normal angle of view. Furthermore, the user may be allowed to select a mode (auto angle mode) for automatically setting the angle of view, and the like.

In a case where the user has selected the wide angle mode, the determination unit 33 sets the wide angle of view as the angle of view, and switches the reference image on the basis of the determination result of the distance and the determination result of the luminance difference. In a case where it is determined that the monochrome captured image is the reference image in both of the determination result of the distance and the determination result of the luminance difference, for example, the determination unit 33 sets the high quality image reference fusion processing as the fusion processing, the monochrome captured image as the reference image, and the wide angle of view as the angle of view. Furthermore, in a case where the color captured image is set as the reference image in at least one of the determination result of the distance or the determination result of the luminance difference, the determination unit 33 sets the wide angle image reference fusion processing as the fusion processing, the color captured image as the reference image, and the wide angle of view as the angle of view.

In a case where the user has selected the normal angle mode, the determination unit 33 sets the normal angle of view (narrow angle of view) as the angle of view of the fusion image. Furthermore, if the angle of view is set to the normal angle of view, the fusion image is not affected by the close subject in the close view detection region and the luminance difference between the image overlapping region and the frame region. Thus, in the case where the user has selected the normal angle mode, the determination unit 33 sets the narrow angle fusion processing as the fusion processing, the monochrome captured image as the reference image, and the normal angle of view as the angle of view regardless of whether or not the predetermined condition is satisfied.

In a case where the user has selected the auto angle mode, in other words, the mode for automatically setting the angle of view of the fusion image, the determination unit 33 switches the reference image and sets the angle of view on the basis of the determination result of the distance and the determination result of the luminance difference. In a case where it is determined that the monochrome captured image is the reference image in both of the determination result of the distance and the determination result of the luminance difference, for example, the determination unit 33 sets the high quality image reference fusion processing as the fusion processing, the monochrome captured image as the reference image, and the wide angle of view as the angle of view. Furthermore, in a case where the color captured image is set as the reference image in at least one of the determination result of the distance or the determination result of the luminance difference, the determination unit 33 sets the narrow angle fusion processing as the fusion processing, the monochrome captured image as the reference image, and the normal angle of view as the angle of view. As described above, if the auto angle mode can be selected, the reference image and the angle of view can be automatically set so that the image overlapping region has the high image quality.

The determination unit 33 determines what type of fusion processing is performed on the basis of the setting information, the determination result of the distance, and the determination of the luminance difference, and generates the fusion determination information indicating the determination result, and proceeds to step ST3 in FIG. 7.

Figure 17:
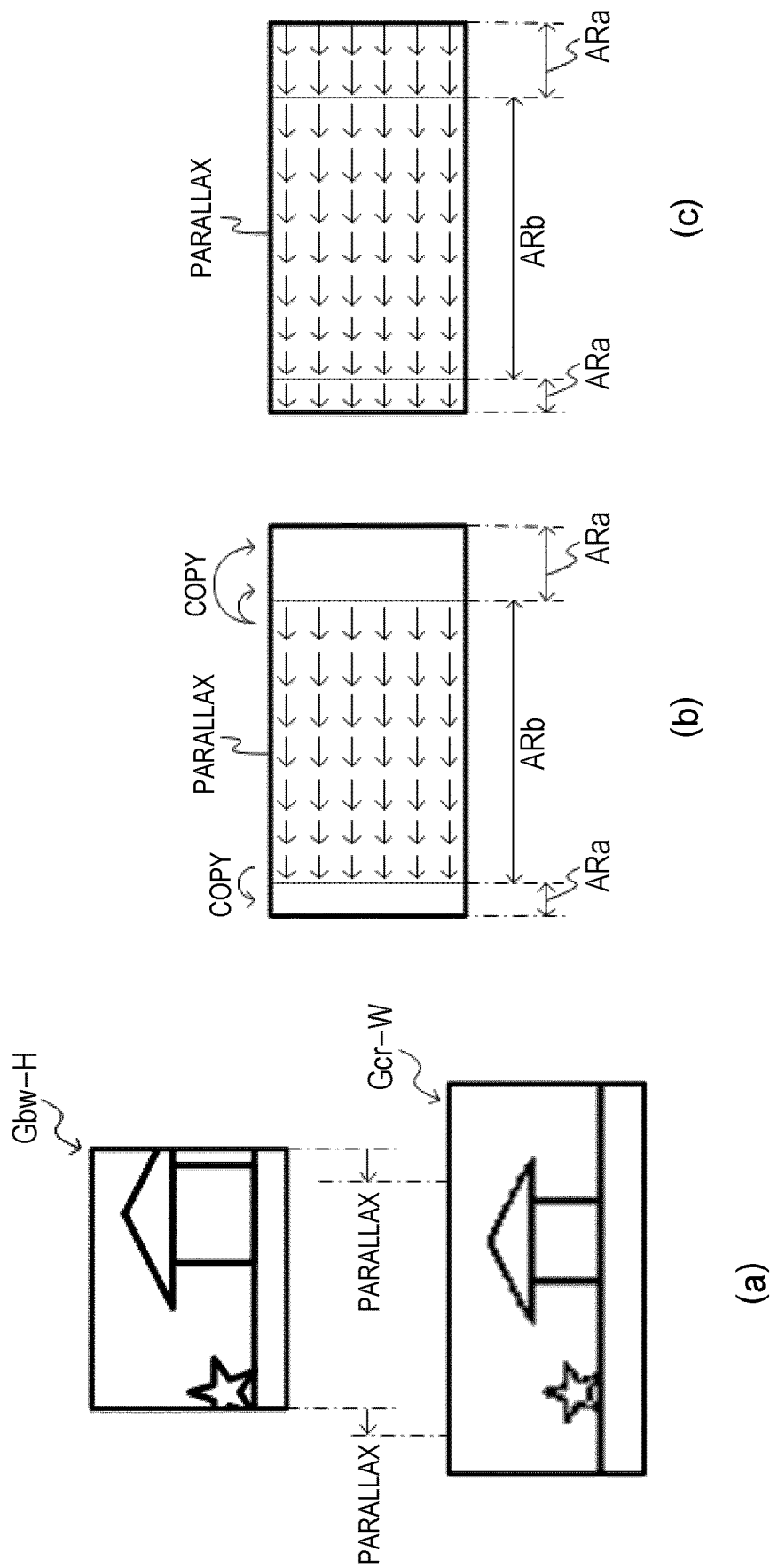
FIG. 17 is a diagram for explaining parallax detection.

In step ST3, the image processing unit performs parallax detection. The parallax detection unit 321 of the image processing unit 30 detects parallax of another captured image with respect to the reference image on the basis of the fusion determination information generated in step ST2. The parallax detection unit 321 detects parallax for each pixel of the reference image. Furthermore, in a case where the fusion determination information indicates that the reference image is monochrome imaging and the angle of view is the wide angle of view, the frame region interpolation unit 322 performs interpolation processing that generates parallax of the frame region, and sets the parallax of the frame region as parallax of a boundary portion in the image overlapping region. FIG. 17 is a diagram for explaining the parallax detection. The parallax detection unit 321 detects the parallax of the other captured image with respect to the reference image on the basis of the fusion determination information by using the monochrome captured image Gbw-H and the color captured image Gcr-W illustrated in (a) of FIG. 17. Here, in a case where the fusion determination information indicates that the reference image is the monochrome captured image and the angle of view is the wide angle of view, parallax of the frame region ARa is not detected as illustrated in (b) of FIG. 17. Note that, in the figure, the detected parallax (parallax vector) is schematically indicated by arrows. Thus, the frame region interpolation unit 322 uses parallax of a pixel positioned at the boundary with the frame region ARa in the image overlapping region ARb as the parallax of the frame region ARa as illustrated in (c) of FIG. 17, and proceeds to step ST4.

In step ST4, the image processing unit performs warping. The warping units 323-H and 323-W of the image processing unit 30 perform the warping on the basis of the fusion determination information generated in step ST2 and the parallax detected in step ST3.

In a case where the fusion determination information indicates that the monochrome captured image is the reference image and the angle of view is the wide angle of view, the warping unit 323-W generates, from the color captured image, a color captured image that is a viewpoint of the monochrome captured image on the basis of a parallax amount detected by the parallax detection unit 321 and a parallax amount of the frame region interpolated by the frame region interpolation unit 322, and outputs the generated image to the image synthesis unit 324. Furthermore, in a case where the fusion determination information indicates that the monochrome captured image is the reference image and the angle of view is the normal angle of view, the warping unit 323-W generates, from an image of the image overlapping region in the color captured image, a color captured image that is a viewpoint of the monochrome captured image on the basis of the parallax amount detected by the parallax detection unit 321, and outputs the generated image to the image synthesis unit 324. Furthermore, in a case where the fusion determination information indicates that the monochrome captured image is the reference image, the warping unit 323-H outputs the monochrome captured image supplied from the preprocessing unit 31-H to the image synthesis unit 324.

In a case where the fusion determination information indicates that the color captured image is the reference image, the warping unit 323-W outputs the color captured image supplied from the preprocessing unit 31-W to the image synthesis unit 324. Furthermore, in the case where the fusion determination information indicates that the color captured image is the reference image, the warping unit 323-H generates, from the monochrome captured image, a monochrome captured image that is a viewpoint of the color captured image on the basis of the parallax amount detected by the parallax detection unit 321, and outputs the generated image to the image synthesis unit 324.

The image processing unit 30 performs the warping on the basis of the fusion determination information and the parallax amount, generates, from the captured image different from the reference image, the captured image of the viewpoint of the reference image, and proceeds to step ST5.

In step ST5, the image processing unit performs image synthesis. The image synthesis unit 324 of the image processing unit 30 synthesizes the monochrome image supplied from the warping unit 323-H and a luminance component image in the color captured image supplied from the warping unit 323-W by matching the positions of the image overlapping regions with each other. Moreover, the image processing unit 30 generates and outputs color image data including the color difference data and the luminance data that is the component equal to the monochrome captured image. Note that, in a case where the moving image is generated, in a case where pipeline processing or parallel processing is performed not limited to sequence processing that performs processing in order of steps, the image processing unit 30 may start generation of the fusion image of the next frame before it is determined that synthesis processing of all lines is completed, for example.

As described above, according to the embodiment of the present technology, the captured image having the wide angle of view and high image quality can be generated without degrading the image quality using the plurality of captured images respectively having different angles of view and image qualities. FIG. 18 illustrates performance of the fusion image generated on the basis of the fusion determination information, and fusion image examples. Note that, (b) of FIG. 18 illustrates the color captured image Gcr-W, and (c) to (e) of FIG. 18 each illustrate a fusion image GFu. The fusion image generated by the high quality image reference fusion processing is illustrated in (c) of FIG. 18, the fusion image generated by the wide angle image reference fusion processing is illustrated in (d) of FIG. 18, and the fusion image generated by the narrow angle fusion processing is illustrated in (e) of FIG. 18.

In a case where the fusion determination information indicates that the high quality image reference fusion processing is performed, the fusion image having the wide angle of view is generated with the monochrome captured image as the reference image. Since the fusion image is generated with the monochrome captured image as the reference image, the image quality of the image overlapping region is the high image quality (double circle mark). Furthermore, in the generation of the fusion image, the color captured image is used for the frame region, so that the image quality of the frame region is image quality equivalent to the color captured image, and the angle of view is the wide angle of view that is an angle of view of the color captured image.

In a case where the fusion determination information indicates that the wide angle image reference fusion processing is performed, the fusion image having the wide angle of view is generated with the color captured image as the reference image. Since the fusion image is generated with the color captured image as the reference image, the image quality of the image overlapping region is a lower image quality (circle mark) as compared with that in the high quality image reference fusion processing. Furthermore, in the generation of the fusion image, the color captured image is used for the frame region, so that the image quality of the frame region is image quality equivalent to the color captured image, and the angle of view is the wide angle of view that is an angle of view of the color captured image.

In a case where the fusion determination information indicates that the narrow angle fusion processing is performed, the fusion image having the narrow angle of view (normal angle of view) is generated with the monochrome captured image as the reference image. Since the fusion image is generated with the monochrome captured image as the reference image, the image quality of the image overlapping region is high image quality (double circle mark) similarly to that in the high quality image reference fusion processing. Furthermore, since the angle of view is the narrow of view, there is no frame region, and the fusion image has the normal angle of view that is an angle of view of the monochrome captured image.

3. Other Embodiments

Meanwhile, the image processing unit is not limited to the one having a configuration that performs determination of the distance and the luminance difference on the basis of the captured image generated in generation of the moving image, and performs the fusion processing of the captured image subsequently generated, on the basis of the fusion determination information generated depending on the determination result. For example, the image processing unit may perform determination of the distance and the luminance difference on the basis of the captured image, and perform the fusion processing of the captured image used for the determination of the distance and the luminance difference on the basis of the fusion determination information generated depending on the determination result. In this case, in the image processing unit 30, the determination unit 33 outputs the fusion determination information to the image synthesis unit 324. Furthermore, the warping unit 323-H and the warping unit 323-W respectively generate the monochrome captured image of the viewpoint of the color captured image and the color captured image of the viewpoint of the monochrome captured image, and output the monochrome captured image and the color captured image, and the monochrome captured image and the color captured image after the viewpoint conversion to the image synthesis unit 324. The image synthesis unit 324 generates a fusion image with the monochrome captured image as a reference or a fusion image with the color captured image as a reference on the basis of the fusion determination information from the determination unit 33. By performing such processing, the image processing unit 30 can perform the fusion processing of the captured image used for the determination of the distance and the luminance difference depending on the determination result of the distance and the luminance difference.

Furthermore, in the above-described embodiment, a case has been described where the captured image having the high image quality is the monochrome captured image, and the captured image having the wide angle of view is the color captured image; however, the captured images are not limited to those in the above-described embodiment. For example, the captured image having the high image quality may be a color captured image having a high resolution or a color captured image having a high resolution and a different color component. Furthermore, the captured image having the high image quality may be a captured image generated by an imaging unit having sensitivity in a wavelength region different from that of the color captured image. For example, an imaging unit having sensitivity in the infrared region is used as the imaging unit having sensitivity in the wavelength region different from that of the color captured image. If the monochrome captured image is acquired by using the imaging unit having sensitivity in the infrared region as the imaging unit 21-H, a fusion image having the wide angle of view can be generated in which the subject positioned in the image overlapping region is made to have the high image quality even in the evening, at night, and the like.

4. Application Example

The technology according to the present disclosure can be applied to various products. The technology according to the present disclosure may be implemented not only as the information processing terminal but also as a device mounted on any type of mobile body, for example, a car, an electric car, a hybrid electric car, a motorcycle, a bicycle, a personal mobility, an airplane, a drone, a ship, a robot, a construction machine, an agricultural machine (tractor), and the like.

Figure 19:
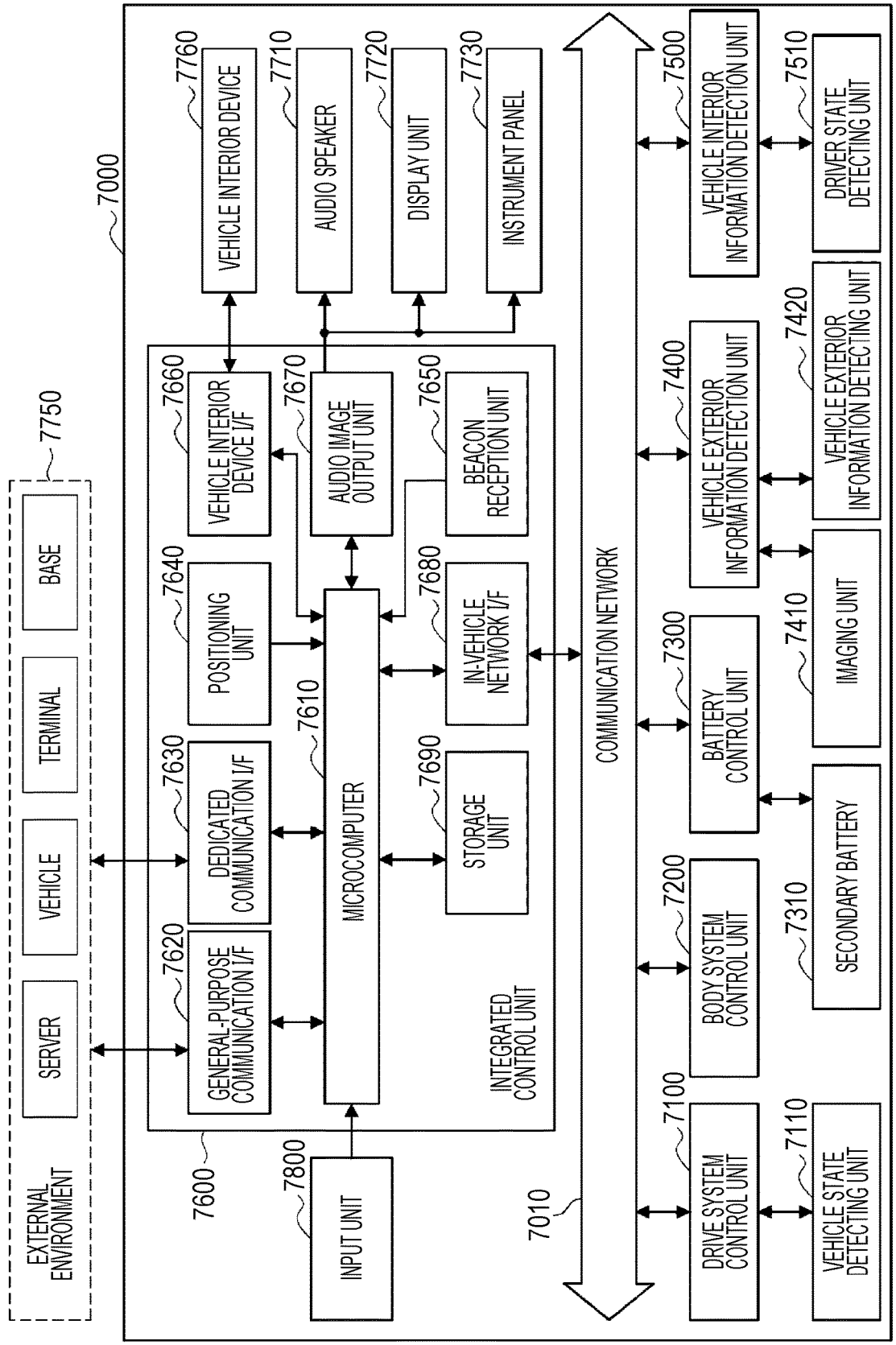
FIG. 19 is a block diagram illustrating an example of a schematic configuration of a vehicle control system.

FIG. 19 is a block diagram illustrating a schematic configuration example of a vehicle control system 7000 that is an example of a mobile body control system to which the technology according to the present disclosure can be applied. The vehicle control system 7000 includes a plurality of electronic control units connected to each other via a communication network 7010. In the example illustrated in FIG. 19, the vehicle control system 7000 includes a drive system control unit 7100, a body system control unit 7200, a battery control unit 7300, a vehicle exterior information detection unit 7400, a vehicle interior information detection unit 7500, and an integrated control unit 7600. The communication network 7010 connecting these plural control units to each other may be, for example, an in-vehicle communication network conforming to an arbitrary standard such as Controller Area Network (CAN), Local Interconnect Network (LIN), Local Area Network (LAN), or FlexRay (registered trademark).

Each control unit includes a microcomputer that performs arithmetic processing in accordance with various programs, a storage unit that stores programs executed by the microcomputer, parameters used for various calculations, or the like, and a drive circuit that drives devices to be controlled. Each control unit includes a network I/F for communicating with other control units via the communication network 7010, and a communication I/F for communicating with devices inside and outside a vehicle, a sensor, or the like by wired communication or wireless communication. FIG. 19 illustrates, as a functional configuration of the integrated control unit 7600, a microcomputer 7610, a general-purpose communication I/F 7620, a dedicated communication I/F 7630, a positioning unit 7640, a beacon reception unit 7650, a vehicle interior device I/F 7660, an audio image output unit 7670, an in-vehicle network I/F 7680, and a storage unit 7690. Similarly, the other control units each include a microcomputer, a communication I/F, a storage unit, and the like.

The drive system control unit 7100 controls operation of devices related to a drive system of a vehicle in accordance with various programs. For example, the drive system control unit 7100 functions as a control device of a driving force generating device for generating driving force of the vehicle, such as an internal combustion engine or a driving motor, a driving force transmitting mechanism for transmitting driving force to wheels, a steering mechanism for adjusting a steering angle of the vehicle, a braking device for generating braking force of the vehicle, and the like. The drive system control unit 7100 may include a function as a control device, such as Antilock Brake System (ABS) or Electronic Stability Control (ESC).

The drive system control unit 7100 is connected to a vehicle state detecting unit 7110. The vehicle state detecting unit 7110 includes, for example, at least one of a gyro sensor that detects angular velocity of axis rotational motion of a vehicle body, an acceleration sensor that detects acceleration of the vehicle, or a sensor for detecting an operation amount of the accelerator pedal, an operation amount of the brake pedal, a steering angle of the steering wheel, engine speed or wheel rotation speed, or the like. The drive system control unit 7100 performs arithmetic processing using a signal input from the vehicle state detecting unit 7110, and controls the internal combustion engine, the driving motor, the electric power steering device, the brake device, or the like.

The body system control unit 7200 controls operation of various devices equipped on the vehicle body in accordance with various programs. For example, the body system control unit 7200 functions as a control device of a keyless entry system, a smart key system, a power window device, or various lamps such as a head lamp, a back lamp, a brake lamp, a turn signal lamp, and a fog lamp. In this case, to the body system control unit 7200, a radio wave transmitted from a portable device that substitutes for a key, or signals of various switches can be input. The body system control unit 7200 accepts input of these radio waves or signals and controls the door lock device, power window device, lamp, and the like of the vehicle.

The battery control unit 7300 controls a secondary battery 7310 that is a power supply source of the driving motor in accordance with various programs. For example, information such as a battery temperature, a battery output voltage, or a battery remaining capacity is input from a battery device including the secondary battery 7310 to the battery control unit 7300. The battery control unit 7300 performs arithmetic processing using these signals, and performs temperature adjustment control of the secondary battery 7310 or control of a cooling device or the like provided in the battery device.

The vehicle exterior information detection unit 7400 detects information regarding the outside of the vehicle on which the vehicle control system 7000 is mounted. For example, at least one of an imaging unit 7410 or a vehicle exterior information detecting unit 7420 is connected to the vehicle exterior information detection unit 7400. The imaging unit 7410 includes at least one of a Time Of Flight (ToF) camera, a stereo camera, a monocular camera, an infrared camera, or other cameras. To the vehicle exterior information detecting unit 7420, for example, at least one of an environmental sensor for detecting the current climate or weather, or a peripheral information detection sensor for detecting another vehicle, an obstacle, a pedestrian, or the like around the vehicle on which the vehicle control system 7000 is mounted.

The environmental sensor may be, for example, at least one of a raindrop sensor that detects rainy weather, a fog sensor that detects fog, a sunshine sensor that detects sunshine degree, or a snow sensor that detects snowfall. The peripheral information detection sensor may be at least one of an ultrasonic sensor, a radar device, or a Light Detection and Ranging (LIDAR) device (Laser Imaging Detection and Ranging (LIDAR) device). The imaging unit 7410 and the vehicle exterior information detecting unit 7420 may be provided as independent sensors or devices, respectively, or may be provided as a device in which a plurality of sensors or devices is integrated together.

Figure 20:
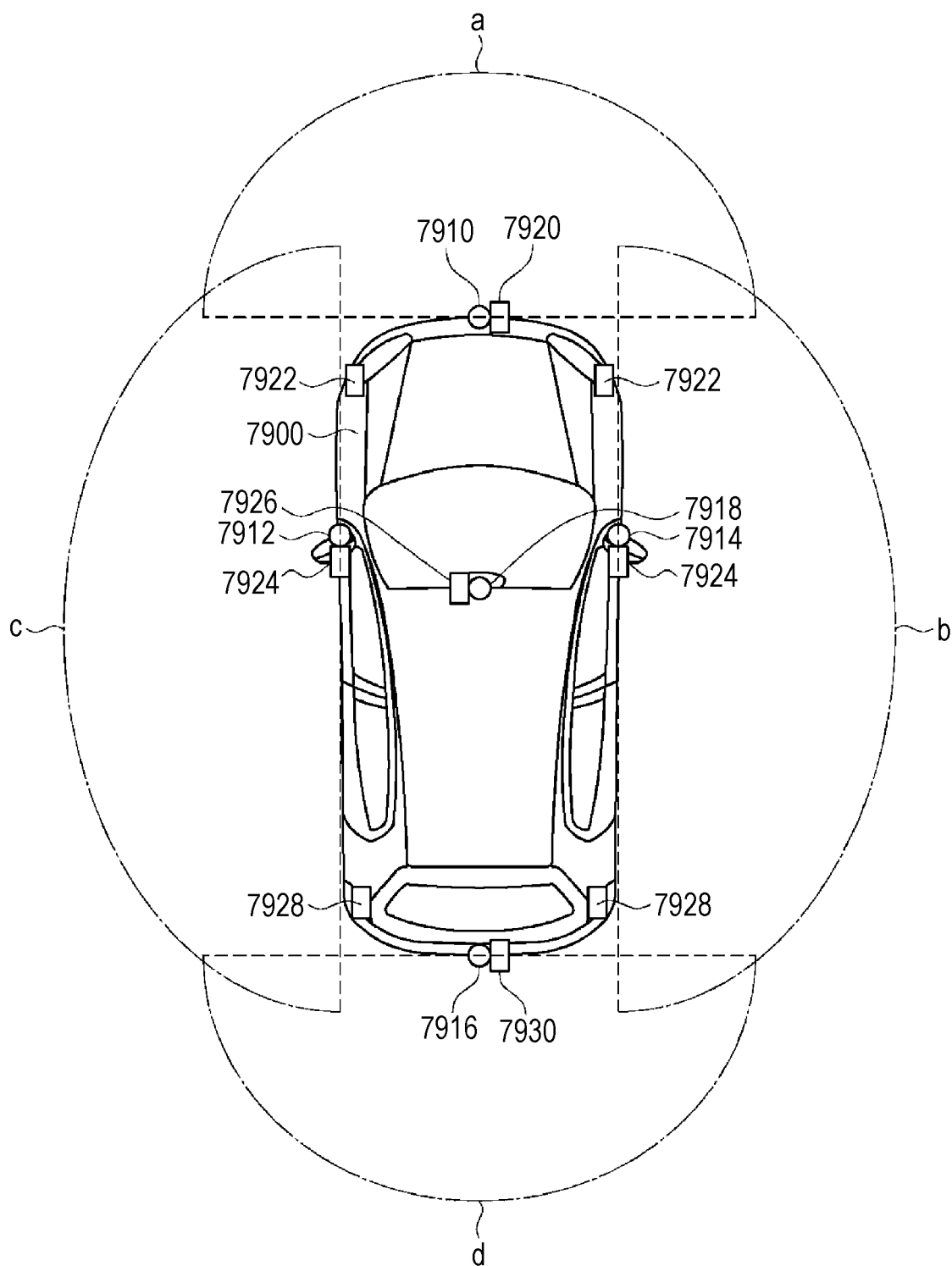
FIG. 20 is an explanatory diagram illustrating an example of installation positions of a vehicle exterior information detecting unit and an imaging unit.

Here, FIG. 20 illustrates an example of installation positions of the imaging unit 7410 and the vehicle exterior information detecting unit 7420. Imaging units 7910, 7912, 7914, 7916, and 7918 are provided at, for example, at least one position of the front nose, the side mirror, the rear bumper, the back door, the upper part of the windshield in the vehicle interior, of a vehicle 7900. The imaging unit 7910 provided at the front nose and the imaging unit 7918 provided at the upper part of the windshield in the vehicle interior mainly acquire images ahead of the vehicle 7900. The imaging units 7912 and 7914 provided at the side mirrors mainly acquire images on the sides of the vehicle 7900. The imaging unit 7916 provided at the rear bumper or the back door mainly acquires an image behind the vehicle 7900. The imaging unit 7918 provided on the upper part of the windshield in the vehicle interior is mainly used for detecting a preceding vehicle, a pedestrian, an obstacle, a traffic signal, a traffic sign, a lane, or the like.

Note that, FIG. 20 illustrates an example of imaging ranges of the imaging units 7910, 7912, 7914, and 7916. An imaging range a indicates an imaging range of the imaging unit 7910 provided at the front nose, imaging ranges b and c respectively indicate imaging ranges of the imaging units 7912 and 7914 provided at the side mirrors, an imaging range d indicates an imaging range of the imaging unit 7916 provided at the rear bumper or the back door. For example, image data captured by the imaging units 7910, 7912, 7914, and 7916 are superimposed on each other, whereby an overhead image is obtained of the vehicle 7900 viewed from above.

Vehicle exterior information detecting units 7920, 7922, 7924, 7926, 7928, and 7930 provided on the front, rear, side, corner, upper part of the windshield in the vehicle interior of the vehicle 7900 may be ultrasonic sensors or radar devices, for example. The vehicle exterior information detecting units 7920, 7926, and 7930 provided on the front nose, rear bumper, back door, and upper part of the windshield in the vehicle interior of the vehicle 7900 may be LIDAR devices, for example. These vehicle exterior information detecting units 7920 to 7930 are mainly used for detecting a preceding vehicle, a pedestrian, an obstacle, or the like.

Referring back to FIG. 19, the description will be continued. The vehicle exterior information detection unit 7400 causes the imaging unit 7410 to capture an image outside the vehicle and receives the image data captured. Furthermore, the vehicle exterior information detection unit 7400 receives detected information from the connected vehicle exterior information detecting unit 7420. In a case where the vehicle exterior information detecting unit 7420 is an ultrasonic sensor, a radar device, or a LIDAR device, the vehicle exterior information detection unit 7400 transmits ultrasonic waves, electromagnetic waves, or the like, and receives information regarding received reflected waves. The vehicle exterior information detection unit 7400 may perform object detection processing or distance detection processing on a person, a car, an obstacle, a sign, a character on a road surface, or the like, on the basis of the received information. The vehicle exterior information detection unit 7400 may perform environment recognition processing for recognizing rainfall, fog, road surface condition, or the like on the basis of the received information. The vehicle exterior information detection unit 7400 may calculate a distance to an object outside the vehicle on the basis of the received information.

Furthermore, the vehicle exterior information detection unit 7400 may perform distance detection processing or image recognition processing for recognizing a person, a car, an obstacle, a sign, a character on a road surface, or the like, on the basis of the received image data. The vehicle exterior information detection unit 7400 may perform processing such as distortion correction or alignment on the received image data, and synthesize the image data captured by different imaging units 7410 to generate an overhead image or a panoramic image. The vehicle exterior information detection unit 7400 may perform viewpoint conversion processing using the image data captured by different imaging units 7410.

The vehicle interior information detection unit 7500 detects information regarding the inside of the vehicle. The vehicle interior information detection unit 7500 is connected to, for example, a driver state detecting unit 7510 that detects a state of a driver. The driver state detecting unit 7510 may include a camera that captures an image of the driver, a biometric sensor that detects biological information of the driver, a microphone that collects sound in the vehicle interior, and the like. The biometric sensor is provided, for example, on a seat surface, a steering wheel, or the like, and detects biological information of an occupant sitting on a seat or a driver holding the steering wheel. The vehicle interior information detection unit 7500 may calculate a degree of fatigue or a degree of concentration of the driver on the basis of detected information input from the driver state detecting unit 7510, and may determine whether or not the driver is dozing. The vehicle interior information detection unit 7500 may perform noise canceling processing or the like on a collected sound signal.

The integrated control unit 7600 controls overall operation in the vehicle control system 7000 in accordance with various programs. The integrated control unit 7600 is connected to an input unit 7800. The input unit 7800 is implemented by a device, for example, a touch panel, a button, a microphone, a switch, a lever, or the like to which input operation by the occupant can be performed. Data obtained by performing voice recognition on the sound input by the microphone may be input to the integrated control unit 7600. The input unit 7800 may be, for example, a remote control device using infrared rays or other radio waves, or an external connection device such as a mobile phone or a personal digital assistant (PDA) adaptable to the operation of the vehicle control system 7000. The input unit 7800 may be a camera, for example, and in that case, the occupant can input information by gesture. Alternatively, data may be input obtained by detecting movement of a wearable device worn by the occupant. Moreover, the input unit 7800 may include, for example, an input control circuit or the like that generates an input signal on the basis of information input by the occupant or the like using the input unit 7800, and outputs the input signal to the integrated control unit 7600. By operating the input unit 7800, the occupant or the like inputs various data to the vehicle control system 7000 or gives an instruction to perform processing operation.

The storage unit 7690 may include Read Only Memory (ROM) that stores various programs executed by the microcomputer, and Random Access Memory (RAM) that stores various parameters, calculation results, sensor values, or the like. Furthermore, the storage unit 7690 may be implemented by a magnetic storage device such as a hard disc drive (HDD), a semiconductor storage device, an optical storage device, a magneto-optical storage device, or the like.

The general-purpose communication I/F 7620 is a general-purpose communication I/F that mediates communication with various devices existing in an external environment 7750. The general-purpose communication I/F 7620 may implement a cellular communication protocol such as Global System of Mobile communications (GSM), WiMAX, Long Term Evolution (LTE), or LTE-Advanced (LTE-A), or other wireless communication protocols such as a wireless LAN (also referred to as Wi-Fi (registered trademark)), and Bluetooth (registered trademark). For example, the general-purpose communication I/F 7620 may connect to a device (for example, an application server or a control server) existing on an external network (for example, the Internet, a cloud network, or a company specific network) via a base station or an access point. Furthermore, the general-purpose communication I/F 7620 may connect to a terminal existing in the vicinity of the vehicle (for example, a terminal of a driver, a pedestrian, or a shop, or a Machine Type Communication (MTC) terminal) by using a Peer To Peer (P2P) technology, for example.

The dedicated communication I/F 7630 is a communication I/F supporting a communication protocol formulated for use in vehicles. For example, the dedicated communication I/F 7630 may implement a standard protocol such as Wireless Access in Vehicle Environment (WAVE) that is a combination of IEEE 802.11p of the lower layer and IEEE 1609 of the upper layer, Dedicated Short Range Communications (DSRC), or a cellular communication protocol. The dedicated communication I/F 7630 typically performs V2X communication that is a concept including one or more of Vehicle to Vehicle communication, Vehicle to Infrastructure communication, Vehicle to Home communication, and Vehicle to Pedestrian communication.

For example, the positioning unit 7640 receives a Global Navigation Satellite System (GNSS) signal (for example, a Global Positioning System (GPS) signal from a GPS satellite) from a GNSS satellite to execute positioning, and generates position information including the latitude, longitude, and altitude of the vehicle. Note that, the positioning unit 7640 may specify the current position by exchanging signals with a wireless access point, or may acquire the position information from a terminal such as a mobile phone, a PHS, or a smartphone having a positioning function.

The beacon reception unit 7650 receives radio waves or electromagnetic waves transmitted from a wireless station or the like installed on a road, for example, and acquires information such as the current position, congestion, road closure, or required time. Note that, the function of the beacon reception unit 7650 may be included in the dedicated communication I/F 7630 described above.

The vehicle interior device I/F 7660 is a communication interface that mediates connection between the microcomputer 7610 and various vehicle interior devices 7760 existing in the vehicle. The vehicle interior device I/F 7660 may establish a wireless connection using a wireless communication protocol such as a wireless LAN, Bluetooth (registered trademark), near field communication (NFC), or Wireless USB (WUSB). Furthermore, the vehicle interior device I/F 7660 may establish a wired connection such as a Universal Serial Bus (USB), High-Definition Multimedia Interface (HDMI), or Mobile High-definition Link (MHL) via a connection terminal (and a cable if necessary) not illustrated. The vehicle interior device 7760 may include, for example, at least one of a mobile device or a wearable device possessed by the occupant, or an information device carried in or attached to the vehicle. Furthermore, the vehicle interior device 7760 may include a navigation device that performs a route search to an arbitrary destination. The vehicle interior device I/F 7660 exchanges control signals or data signals with these vehicle interior devices 7760.

The in-vehicle network I/F 7680 is an interface that mediates communication between the microcomputer 7610 and the communication network 7010. The in-vehicle network I/F 7680 transmits and receives signals and the like in accordance with a predetermined protocol supported by the communication network 7010.

The microcomputer 7610 of the integrated control unit 7600 controls the vehicle control system 7000 in accordance with various programs on the basis of information acquired via at least one of the general-purpose communication I/F 7620, the dedicated communication I/F 7630, the positioning unit 7640, the beacon reception unit 7650, the vehicle interior device I/F 7660, or the in-vehicle network I/F 7680. For example, the microcomputer 7610 may calculate a control target value of the driving force generating device, the steering mechanism, or the braking device on the basis of acquired information inside and outside the vehicle, and output a control command to the drive system control unit 7100. For example, the microcomputer 7610 may perform cooperative control aiming for implementing functions of advanced driver assistance system (ADAS) including collision avoidance or shock mitigation of the vehicle, follow-up traveling based on an inter-vehicle distance, vehicle speed maintaining traveling, vehicle collision warning, vehicle lane departure warning, or the like. Furthermore, the microcomputer 7610 may perform cooperative control aiming for automatic driving or the like that autonomously travels without depending on operation of the driver, by controlling the driving force generating device, the steering mechanism, the braking device, or the like on the basis of acquired information around the vehicle.

The microcomputer 7610 may generate three-dimensional distance information between the vehicle and an object such as a surrounding structure or a person on the basis of information acquired via at least one of the general-purpose communication I/F 7620, the dedicated communication I/F 7630, the positioning unit 7640, the beacon reception unit 7650, the vehicle interior device I/F 7660, or the in-vehicle network I/F 7680, and create local map information including peripheral information of the current position of the vehicle. Furthermore, on the basis of the acquired information, the microcomputer 7610 may predict danger such as collision of a vehicle, approach of a pedestrian or the like, or entry into a road closed, and generate a warning signal. The warning signal may be, for example, a signal for generating a warning sound or for turning on a warning lamp.

The audio image output unit 7670 transmits an output signal of at least one of the audio or image to an output device capable of visually or aurally notifying an occupant in the vehicle or the outside of the vehicle of information. In the example of FIG. 19, as the output device, an audio speaker 7710, a display unit 7720, and an instrument panel 7730 are illustrated. The display unit 7720 may include, for example, at least one of an on-board display or a head-up display. The display unit 7720 may have an Augmented Reality (AR) display function. The output device may be another device other than these devices, such as a lamp, a projector, or a wearable device such as a headphone and an eyeglass type display worn by the occupant. In a case where the output device is a display device, the display device visually displays results obtained by the various types of processing performed by the microcomputer 7610 or information received from the other control units in various formats such as text, an image, a table, or a graph. Furthermore, in a case where the output device is an audio output device, the audio output device converts an audio signal including reproduced audio data, acoustic data, and the like into an analog signal to aurally output the analog signal.

Note that, in the example illustrated in FIG. 19, at least two control units connected together via the communication network 7010 may be integrated as one control unit. Alternatively, each control unit may be configured by plural control units. Moreover, the vehicle control system 7000 may include another control unit not illustrated. Furthermore, in the above description, some or all of the functions performed by any of the control units may be performed by another control unit. That is, as long as information is transmitted and received via the communication network 7010, predetermined arithmetic processing may be performed by any of the control units. Similarly, a sensor or device connected to any of the control units may be connected to another control unit, and plural control units may mutually transmit and receive detected information via the communication network 7010.

In the vehicle control system 7000 described above, the imaging units 7410, 7910, 7912, 7914, 7916, and 7918 are configured to use a plurality of imaging units, for example, the imaging units 21-H and 21-W illustrated in FIG. 2. Furthermore, the image processing unit 30 is provided in the integrated control unit 7600 of the application example illustrated in FIG. 19. With such a configuration, even if the imaging units 7410, 7910, 7912, 7914, 7916, and 7918 are downsized and thinned, the captured image having the high image quality and the wide angle of view can be acquired, so that the acquired captured image can be used for driving support, driving control, and the like. Note that, the image processing unit 30 may be implemented in a module (for example, an integrated circuit module including one die) for the integrated control unit 7600 illustrated in FIG. 19.

The series of processing steps described in the specification can be executed by hardware, software, or a combination of both. In a case where processing by software is executed, a program recording a processing sequence is installed in a memory in a computer incorporated in dedicated hardware and executed. Alternatively, the program can be installed and executed in a general-purpose computer capable of executing various types of processing.

For example, the program can be recorded in advance in Read Only Memory (ROM), a Solid State Drive (SSD) or a hard disk as a recording medium. Alternatively, the program can be temporarily or permanently stored (recorded) in a removable recording medium such as a flexible disk, compact disc read only memory (CD-ROM), magneto optical (MO) disk, digital versatile disc (DVD), Blu-ray Disc (registered trademark) (BD), magnetic disk, or semiconductor memory card. Such a removable recording medium can be provided as so-called packaged software.

Furthermore, the program may be transferred wirelessly or by wire to the computer from a download site through the network such as a local area network (LAN) or the Internet, besides being installed from the removable recording medium to the computer. The computer can receive the program transmitted in that way, and install the program in the recording medium such as a built-in hard disk.

Note that, the advantageous effects described in this specification are merely examples, and the advantageous effects of the present technology are not limited to them and may include additional effects that are not described herein. Furthermore, the present technology should not be interpreted to be limited to the embodiments of the technology described above. The embodiments of the present technology disclose the present technology through examples, and it should be obvious that those skilled in the art can modify or replace those embodiments with other embodiments without departing from the scope of the technology. In other words, the claims should be taken into account in understanding the subject matter of the present technology.

Furthermore, the image processing device of the present technology can have the following configuration.

(1) An image processing device including a fusion processing unit performing warping with a high quality image as a reference on a wide angle image having a lower image quality and a wider angle of view than the high quality image, the fusion processing unit performing high quality image reference fusion processing that generates a fusion image by matching positions of image overlapping regions with each other of the high quality image and the wide angle image after the warping.

(2) The image processing device according to (1), in which the fusion processing unit performs the warping on the basis of parallax information indicating a parallax between the high quality image and the wide angle image.

(3) The image processing device according to (2), in which the fusion processing unit interpolates parallax information on an image non-overlapping region not included in the high quality image in the wide angle image by using parallax information on the image overlapping region.

(4) The image processing device according to any of (1) to (3), in which the fusion processing unit performs warping with the wide angle image as a reference by using the high quality image, and performs wide angle image reference fusion processing that generates a fusion image by matching positions of the image overlapping regions with each other of the high quality image after the warping and the wide angle image on which warping is not performed, or the high quality image reference fusion processing.

(5) The image processing device according to (4), further including a determination unit that determines whether or not the predetermined condition is satisfied, in which the fusion processing unit performs the wide angle image reference fusion processing in a case where the predetermined condition is not satisfied, and performs the high quality image reference fusion processing in a case where the predetermined condition is satisfied.

(6) The image processing device according to (5), in which the determination unit sets that a subject distance determined on the basis of parallax information is longer than a determination threshold value, as the predetermined condition.

(7) The image processing device according to (6), in which the subject distance is a subject distance of a subject positioned in an image non-overlapping region not included in the high quality image in the wide angle image.

(8) The image processing device according to any of (5) to (7), in which the determination unit sets that a luminance difference between the high quality image and the wide angle image is equal to or less than a determination threshold value, as the predetermined condition.

(9) The image processing device according to (8), in which the luminance difference is a difference between average luminances of an image region within a predetermined range from a boundary with the image non-overlapping region in the image overlapping region.

(10) The image processing device according to any of (5) to (9), in which the fusion processing unit performs warping with the high quality image as the reference by using the wide angle image, and performs narrow angle fusion processing that generates a fusion image having an angle of view of the high quality image by matching positions of the image overlapping regions with each other of the high quality image and the wide angle image after the warping depending on a determination result of the determination unit.

(11) The image processing device according to (10), in which the fusion processing unit performs the high quality image reference fusion processing or the wide angle image reference fusion processing on the basis of the determination result of the determination unit in a case where the high quality image and the wide angle image are moving images and a fusion image is generated having an angle of view of the wide angle image.

(12) The image processing device according to (10), in which the fusion processing unit performs the high quality image reference fusion processing, the wide angle image reference fusion processing, or the narrow angle fusion processing in a case where the high quality image and the wide angle image are still images.

(13) The image processing device according to (12), in which the fusion processing unit performs the wide angle image reference fusion processing or the narrow angle fusion processing in a case where the predetermined condition is not satisfied.

(14) The image processing device according to (13), in which the fusion processing unit performs the narrow angle fusion processing in a case where it is determined by the determination unit that mode selection for automatically setting an angle of view of a fusion image is performed in a case where the predetermined condition is not satisfied.

(15) The image processing device according to any of (10) to (14), in which the determination unit determines user selection operation of fusion processing, and the fusion processing unit performs the narrow angle fusion processing regardless of whether or not the predetermined condition is satisfied in a case where it is determined by the determination unit that the narrow angle fusion processing is selected.

INDUSTRIAL APPLICABILITY

In the image processing device and the image processing method of this technology, the warping with the high quality image as the reference on the wide angle image having the lower image quality and the wider angle of view than the high quality image, and the processing that synthesizes the high quality image having the higher image quality than the wide angle image and the wide angle image after the warping by matching the positions of the image overlapping regions with each other, are performed, so that the fusion image is generated. For this reason, the captured image having the wide angle of view and high image quality can be generated without degrading the image quality using the plurality of captured images respectively having different angles of view and image qualities. Thus, this technology is suitable for a device that uses an imaging unit and requires downsizing and thinning of the imaging unit.

REFERENCE SIGNS LIST

10 Information processing terminal
21-H, 21-W Imaging unit
30 Image processing unit
31-H, 31-W Preprocessing unit
32 Fusion processing unit
33 Determination unit
51 Sensor unit
52 Communication unit
53 Display unit
54 Touch panel
55 Operation unit
56 Storage unit
60 Control unit
321 Parallax detection unit
322 Frame region interpolation unit
323-H, 323-W Warping unit
324 Image synthesis unit
331 Distance measurement unit
332 Distance determination unit
333 Luminance difference determination unit
334 Integration determination unit

The invention claimed is:

1. An image processing device comprising
a fusion processing unit performing warping with a high quality image as a reference on a wide angle image having a lower image quality and a wider angle of view than the high quality image, the fusion processing unit performing high quality image reference fusion processing that generates a fusion image by matching positions of image overlapping regions with each other of the high quality image and the wide angle image after the warping, wherein the fusion processing unit performs warping with the wide angle image as a reference by using the high quality image, and performs wide angle image reference fusion processing that generates a fusion image by matching positions of the image overlapping regions with each other of the high quality image after the warping and the wide angle image on which warping is not performed, or the high quality image reference fusion processing; and a determination unit that determines whether or not a predetermined condition is satisfied, wherein the fusion processing unit performs the wide angle image reference fusion processing in a case where the predetermined condition is not satisfied, and performs the high quality image reference fusion processing in a case where the predetermined condition is satisfied, wherein the fusion processing unit and the determination unit are each implemented via at least one processor.

2. The image processing device according to claim 1, wherein
the fusion processing unit performs the warping on a basis of parallax information indicating a parallax between the high quality image and the wide angle image.

3. The image processing device according to claim 2, wherein
the fusion processing unit interpolates parallax information on an image non-overlapping region not included in the high quality image in the wide angle image by using parallax information on the image overlapping region.

4. The image processing device according to claim 1, wherein
the determination unit sets that a subject distance determined on a basis of parallax information is longer than a determination threshold value, as the predetermined condition.

5. The image processing device according to claim 4, wherein
the subject distance is a subject distance of a subject positioned in an image non-overlapping region not included in the high quality image in the wide angle image.

6. The image processing device according to claim 1, wherein
the determination unit sets that a luminance difference between the high quality image and the wide angle image is equal to or less than a determination threshold value, as the predetermined condition.

7. The image processing device according to claim 6, wherein
the luminance difference is a difference between average luminances of an image region within a predetermined range from a boundary with the image non-overlapping region in the image overlapping region.

8. The image processing device according to claim 1, wherein
the fusion processing unit performs warping with the high quality image as the reference by using the wide angle image, and performs narrow angle fusion processing that generates a fusion image having an angle of view of the high quality image by matching positions of the image overlapping regions with each other of the high quality image and the wide angle image after the warping depending on a determination result of the determination unit.

9. The image processing device according to claim 8, wherein
the fusion processing unit performs the high quality image reference fusion processing or the wide angle image reference fusion processing on a basis of the determination result of the determination unit in a case where the high quality image and the wide angle image are moving images and a fusion image is generated having an angle of view of the wide angle image.

10. The image processing device according to claim 8, wherein
the fusion processing unit performs the high quality image reference fusion processing, the wide angle image reference fusion processing, or the narrow angle fusion processing in a case where the high quality image and the wide angle image are still images.

11. The image processing device according to claim 10, wherein
the fusion processing unit performs the wide angle image reference fusion processing or the narrow angle fusion processing in a case where the predetermined condition is not satisfied.

12. The image processing device according to claim 11, wherein
the fusion processing unit performs the narrow angle fusion processing in a case where it is determined by the determination unit that mode selection for automatically setting an angle of view of a fusion image is performed in a case where the predetermined condition is not satisfied.

13. The image processing device according to claim 8, wherein
the determination unit determines user selection operation of fusion processing, and
the fusion processing unit performs the narrow angle fusion processing regardless of whether or not the predetermined condition is satisfied in a case where it is determined by the determination unit that the narrow angle fusion processing is selected.

14. An image processing method comprising:
performing warping with a high quality image as a reference on a wide angle image having a lower image quality and a wider angle of view than the high quality image and performing high quality image reference fusion processing that generates a fusion image by matching positions of image overlapping regions with each other of the high quality image and the wide angle image after the warping, wherein the warping is performed with the wide angle image as a reference by using the high quality image, and wide angle image reference fusion processing is performed that generates a fusion image by matching positions of the image overlapping regions with each other of the high quality image after the warping and the wide angle image on which warping is not performed, or the high quality image reference fusion processing; and determining whether or not a predetermined condition is satisfied, wherein the wide angle image reference fusion processing is performed in a case where the predetermined condition is not satisfied, and the high quality image reference fusion processing is performed in a case where the predetermined condition is satisfied.

15. A non-transitory computer-readable medium having embodied thereon a program, which when executed by a computer causes the computer to execute a method, the method comprising
performing warping with a high quality image as a reference on a wide angle image having a lower image quality and a wider angle of view than the high quality image and performing high quality image reference fusion processing that generates a fusion image by matching positions of image overlapping regions with each other of the high quality image and the wide angle image after the warping, wherein the warping is performed with the wide angle image as a reference by using the high quality image, and wide angle image reference fusion processing is performed that generates a fusion image by matching positions of the image overlapping regions with each other of the high quality image after the warping and the wide angle image on which warping is not performed, or the high quality image reference fusion processing; and determining whether or not a predetermined condition is satisfied, wherein the wide angle image reference fusion processing is performed in a case where the predetermined condition is not satisfied, and the high quality image reference fusion processing is performed in a case where the predetermined condition is satisfied.

* * * * *